United States Patent
Willoughby et al.

(10) Patent No.: US 12,330,682 B2
(45) Date of Patent: Jun. 17, 2025

(54) AUTONOMOUS VEHICLE NAVIGATION IN RESPONSE TO AN ONCOMING TRAIN ON A RAILROAD TRACK

(71) Applicant: TuSimple, Inc., San Diego, CA (US)

(72) Inventors: Hunter Scott Willoughby, San Diego, CA (US); Dishi Li, Ann Arbor, MI (US); Yufei Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 38 days.

(21) Appl. No.: 18/048,941

(22) Filed: Oct. 24, 2022

(65) Prior Publication Data

US 2023/0138981 A1    May 4, 2023

Related U.S. Application Data

(60) Provisional application No. 63/273,868, filed on Oct. 29, 2021.

(51) Int. Cl.
*B60W 60/00* (2020.01)
*B60W 30/18* (2012.01)
(Continued)

(52) U.S. Cl.
CPC .. *B60W 60/0015* (2020.02); *B60W 30/18159* (2020.02); *B60W 60/001* (2020.02);
(Continued)

(58) Field of Classification Search
None
See application file for complete search history.

(56) References Cited

U.S. PATENT DOCUMENTS 5,711,139 A    1/1998    Swanson
9,499,172 B2   11/2016   Urmson
(Continued)

FOREIGN PATENT DOCUMENTS

CN    113167038 A  *  7/2021  ...... B60W 30/18009
DE    102012022629 A1   6/2013
(Continued)

OTHER PUBLICATIONS

English translation of JP2005165643A, retrieved from Espacenet on Jul. 27, 2024 (Year: 2024).*

(Continued)

*Primary Examiner* — Amelia Vorce
(74) *Attorney, Agent, or Firm* — Perkins Coie LLP

(57) ABSTRACT

A control device associated with an autonomous vehicle receives sensor data and detects that the autonomous vehicle is approaching a railroad crossing based on the sensor data. The control device determines a target lane to travel while crossing the railroad. The target lane is a lane that has available space with at least a length of the autonomous vehicle on the other side of the railroad as opposed to a side of the railroad where the autonomous vehicle is currently traveling. The control device instructs the autonomous vehicle to travel on the target lane. The control device determines that a train is approaching the railroad crossing and waits for the train to pass the railroad crossing. The control device determines that the train has passed the railroad crossing. The control device instructs the autonomous vehicle to cross the railroad.

20 Claims, 12 Drawing Sheets

(51) Int. Cl.
  *G01C 21/00* (2006.01)
  *G01C 21/34* (2006.01)
  *G06V 20/56* (2022.01)
  *G06V 20/58* (2022.01)
(52) U.S. Cl.
  CPC .. *B60W 60/0011* (2020.02); *B60W 60/00182* (2020.02); *B60W 60/00274* (2020.02); *G01C 21/3415* (2013.01); *G01C 21/3815* (2020.08); *G06V 20/582* (2022.01); *G06V 20/588* (2022.01); *B60W 2300/145* (2013.01); *B60W 2530/201* (2020.02); *B60W 2552/50* (2020.02); *B60W 2552/53* (2020.02); *B60W 2554/80* (2020.02); *B60W 2555/60* (2020.02); *B60W 2556/40* (2020.02)

(56) References Cited

U.S. PATENT DOCUMENTS

| | | |
|---|---|---|
| 9,558,659 B1 | 1/2017 | Silver |
| 9,598,076 B1 | 3/2017 | Jain et al. |
| 10,156,851 B1 | 12/2018 | Silver |
| 10,300,851 B1 | 5/2019 | Kim et al. |
| 10,503,987 B2 | 12/2019 | Banno et al. |
| 11,322,025 B2 | 5/2022 | Zhang et al. |
| 11,491,983 B1 | 11/2022 | Sun et al. |
| 11,623,675 B1 | 4/2023 | O'Sullivan |
| 11,710,352 B1 | 7/2023 | Ulutan et al. |
| 11,835,959 B1 | 12/2023 | Silver |
| 11,971,714 B2 | 4/2024 | Tremblay |
| 2008/0162027 A1* | 7/2008 | Murphy ............... G05D 1/0246 701/1 |
| 2010/0235034 A1 | 9/2010 | Higgins |
| 2012/0041671 A1 | 2/2012 | Miura |
| 2015/0109146 A1 | 4/2015 | Drobot et al. |
| 2016/0144867 A1 | 5/2016 | Delp et al. |
| 2016/0280224 A1 | 9/2016 | Tatourian et al. |
| 2017/0144663 A1 | 5/2017 | Karlsson et al. |
| 2017/0158225 A1 | 6/2017 | Brown et al. |
| 2017/0232967 A1 | 8/2017 | Tomatsu et al. |
| 2017/0242436 A1 | 8/2017 | Creusot |
| 2017/0262790 A1 | 9/2017 | Khasis |
| 2017/0297563 A1 | 10/2017 | Kava et al. |
| 2017/0364759 A1 | 12/2017 | Creusot |
| 2018/0171925 A1 | 6/2018 | Pavlov |
| 2018/0174443 A1 | 6/2018 | Fowe et al. |
| 2018/0237016 A1 | 8/2018 | Khafagy et al. |
| 2018/0354530 A1 | 12/2018 | Freund |
| 2018/0364055 A1 | 12/2018 | Laur et al. |
| 2019/0016334 A1 | 1/2019 | Mafrica et al. |
| 2019/0080599 A1* | 3/2019 | Ishikawa ............... G06V 20/582 |
| 2019/0122558 A1* | 4/2019 | Matsunaga ........... B60W 30/09 |
| 2019/0155283 A1 | 5/2019 | Herbach |
| 2019/0163185 A1 | 5/2019 | Bin-Hun |
| 2019/0179305 A1 | 6/2019 | Magzimof et al. |
| 2019/0258253 A1 | 8/2019 | Tremblay |
| 2019/0286125 A1* | 9/2019 | Kawagoe ........... G02B 27/0101 |
| 2019/0317493 A1 | 10/2019 | Park et al. |
| 2020/0066159 A1 | 2/2020 | Chase |
| 2020/0079368 A1 | 3/2020 | Yamada et al. |
| 2020/0089253 A1* | 3/2020 | Sudo ................... G05D 1/0221 |
| 2020/0094831 A1* | 3/2020 | Kudo ............... B60W 50/0097 |
| 2020/0166362 A1* | 5/2020 | Ichinokawa ......... G06V 20/588 |
| 2020/0189619 A1 | 6/2020 | Honda |
| 2020/0192351 A1 | 6/2020 | Rastoll et al. |
| 2020/0193823 A1 | 6/2020 | Zhang |
| 2020/0193878 A1 | 6/2020 | Shepard et al. |
| 2020/0201323 A1 | 6/2020 | Park |
| 2020/0210814 A1 | 7/2020 | Mchr |
| 2020/0233415 A1 | 7/2020 | Panzica |
| 2020/0250540 A1 | 8/2020 | Mehr |
| 2020/0250894 A1 | 8/2020 | Mehr et al. |
| 2020/0255005 A1 | 8/2020 | Matsunaga |
| 2020/0255033 A1* | 8/2020 | Matsunaga ..... B60W 30/18145 |
| 2020/0269877 A1 | 8/2020 | Mortazavi et al. |
| 2020/0293832 A1 | 9/2020 | Buslaev |
| 2020/0298884 A1* | 9/2020 | Goto ............... B60W 30/18159 |
| 2020/0307633 A1 | 10/2020 | Naruse et al. |
| 2020/0320875 A1 | 10/2020 | Lacaze et al. |
| 2020/0324777 A1 | 10/2020 | Kato et al. |
| 2020/0346664 A1 | 11/2020 | Sippl et al. |
| 2020/0377128 A1 | 12/2020 | Marczuk et al. |
| 2021/0001893 A1 | 1/2021 | Etcheverry et al. |
| 2021/0034060 A1* | 2/2021 | Patnaik ................... H04W 4/46 |
| 2021/0041869 A1 | 2/2021 | Meyer |
| 2021/0046951 A1 | 2/2021 | Kirn |
| 2021/0094582 A1 | 4/2021 | Lee et al. |
| 2021/0109528 A1 | 4/2021 | Heyl |
| 2021/0129867 A1* | 5/2021 | Araki ..................... G08G 1/166 |
| 2021/0139061 A1* | 5/2021 | Hilleary ................. B61L 29/30 |
| 2021/0206379 A1 | 7/2021 | Bobier-Tiu |
| 2021/0208583 A1 | 7/2021 | Keller et al. |
| 2021/0406559 A1 | 12/2021 | Efland et al. |
| 2022/0019225 A1 | 1/2022 | Foley et al. |
| 2022/0051239 A1 | 2/2022 | Bergeron et al. |
| 2022/0121216 A1 | 4/2022 | Hsiao |
| 2022/0266857 A1 | 8/2022 | Tamura et al. |
| 2022/0318560 A1 | 10/2022 | Kishon et al. |
| 2022/0324480 A1 | 10/2022 | Tsunekazu |
| 2022/0348222 A1 | 11/2022 | Zhao et al. |
| 2023/0024393 A1* | 1/2023 | Kiley ............... G08G 1/096725 |
| 2023/0066521 A1 | 3/2023 | Willoughby |
| 2023/0067485 A1 | 3/2023 | Willoughby |
| 2023/0100640 A1* | 3/2023 | Woycik ................. B61L 29/246 701/117 |
| 2023/0256972 A1 | 8/2023 | Roy |

FOREIGN PATENT DOCUMENTS

| | | | |
|---|---|---|---|
| DE | 102015223656 A1 | 6/2017 | |
| DE | 102018004113 A1 | 10/2018 | |
| DE | 102018203237 A1 | 9/2019 | |
| DE | 102020212797 A1 | 4/2021 | |
| EP | 2416119 A2 | 2/2012 | |
| EP | 4044112 A1 | 8/2022 | |
| JP | 2005165643 A | 6/2005 | |
| JP | 6645001 B2 * | 2/2020 | ............ B60W 40/06 |
| JP | 2021101268 A | 7/2021 | |
| KR | 20230145623 A | 10/2023 | |
| WO | 2014039200 A1 | 3/2014 | |
| WO | 2014130178 A1 | 8/2014 | |
| WO | 2019009382 A1 | 1/2019 | |
| WO | 2020041443 | 2/2020 | |
| WO | 2020086822 A1 | 4/2020 | |
| WO | 2022251880 A1 | 12/2022 | |
| WO | WO-2023171068 A1 * | 9/2023 | |

OTHER PUBLICATIONS

3 Ways to Cross a Railroad Crossing, www.wikihow.com/Cross-a-Railroad-Crossing, retrieved on Feb. 1, 2023, pp. 1,2.
International Search Report and Written Opinion for Application No. PCT/US2022/078621, mailed Feb. 10, 2023.
Bowman et al, B. Consequences of Mandatory Stops at Railroad-Highway Crossings, Google Scholar, U.S. Department of Transportation, Federal Highway Administration, Dec. 1985 Final Report, pp. 1-176. (Year: 1985).
Invitation to Pay Additional Fees received in PCT/US2022/048289, mailed Feb. 27, 2023.
International Search Report and Written Opinion in Application No. PCT/US2022/048289, mailed Apr. 28, 2023.
DC municipal code regulation section 18-2209.1 (Year: 2002).
Hansen et al., "Digital Signal Processing for In-Vehicle Systems and Safety," DOI 10.1007978-1-4419--9607-7 15, Springer Science+ Business Media, LLC 2012 (Year: 2012).
Mishra et al., "Authorized Traffic Controller Hand Gesture Recognition for Situation-Aware Autonomous Driving," Sensors (Basel, Switzerland) 21.23 (2021): 79•14—. Web. (Year: 2021).
Qian et al., "Aladdin's Magic Carpet: Navigation by in-Air Static Hand Gesture in Autonomous Vehicles," International Journal of

(56) References Cited

OTHER PUBLICATIONS

Human-Computer Interaction, 36.20 (2020): 1912-1927. Web. (Year: 2020).

Shi et al., Opportunities and Challenges for Flagman Recognition in Autonomous Vehicles, Jul. 11-17, 2021, IEEE Intelligent Vehicles Symposium, 1470-1477 (Year: 2021).

International Search Report from related International Application No. PCT/US2022/073730 dated Jan. 10, 2023 (19 pages).

International Search Report and Written Opinion for Application No. PCT/US2022/078640, mailed Feb. 16, 2023.

Patent Cooperation Treaty, PCT Notification of Transmittal of the International Search Report and the Written Opinion of the International Searching Authority, or the Declaration, PCT/US2022/078645, mailed Feb. 16, 2023.

Ansar H. et al., "Hand Gesture Recognition Based on Auto-Landmark Localization and Reweighted Genetic Algorithm for Healthcare Muscle Activities," Sustainability 2021, 13, 2961, 26 pages.

* cited by examiner

AUTONOMOUS VEHICLE NAVIGATION IN RESPONSE TO AN ONCOMING TRAIN ON A RAILROAD TRACK

PRIORITY

This application claims priority to U.S. Provisional Patent Application No. 63/273,868 filed Oct. 29, 2021 and titled "System and method for an autonomous vehicle," which is incorporated herein by reference.

TECHNICAL FIELD

The present disclosure relates generally to autonomous vehicles. More particularly, the present disclosure is related to autonomous vehicle navigation in response to an oncoming train on a railroad track.

BACKGROUND

One aim of autonomous vehicle technology is to provide vehicles that can safely navigate with limited or no driver assistance. In some situations, an autonomous vehicle may encounter a railroad crossing on its traveling path. It is challenging to differentiate and evaluate different situations and traffic conditions when an autonomous vehicle encounters a railroad crossing and propose an appropriate navigation plan specific to each experienced situation.

SUMMARY

This disclosure recognizes various problems and previously unmet needs related to autonomous vehicle navigation, and more specifically to the lack of autonomous vehicle navigation technology in scenarios where an autonomous vehicle encounters a railroad crossing. The current autonomous vehicle navigation technology lacks the capability to evaluate a situation where the autonomous vehicle detects a railroad crossing and to propose an appropriate navigation plan for the autonomous vehicle according to the experienced situation. In some cases, the autonomous vehicle may encounter a railroad crossing where no train is approaching or traveling through the railroad crossing. In some cases, the autonomous vehicle may encounter a railroad crossing where a train is approaching or traveling through the railroad crossing. In some cases, the autonomous vehicle may encounter a closed railroad crossing (e.g., out of service or unpassable railroad crossing). In some cases, the autonomous vehicle may encounter a stopped vehicle at a railroad crossing even though no train is approaching or traveling through the railroad crossing. The current autonomous vehicle navigation technology does not provide a safe, efficient, and reliable solution for such cases and does not propose an appropriate navigation plan for the autonomous vehicle specific to each case. This may lead to unsafe driving situations for the autonomous vehicle, other vehicles, passing trains, and pedestrians. In the current autonomous vehicle navigation, either a traveling path of an autonomous vehicle is selected to avoid routes that include railroad crossings or a driver manually drives the autonomous vehicle through the railroad crossing in every situation. Therefore, the current autonomous vehicle navigation lacks a technical solution for autonomous vehicle navigation technology.

Certain embodiments of the present disclosure provide unique technical solutions to technical problems of current autonomous vehicle technologies, including those problems described above to improve autonomous vehicle navigation.

The disclosed system is configured to evaluate each situation where a railroad crossing is encountered by an autonomous vehicle and determine an appropriate navigation plan for the autonomous vehicle based on each situation. Therefore, the disclosed system is integrated into a practical application of improving autonomous vehicle navigation in general, and more specifically, in situations where the autonomous vehicle encounters a railroad crossing on its traveling path. This, in turn, provides an additional practical application of providing a safer driving experience for autonomous vehicles and other vehicles around railroad crossings.

In some cases, the disclosed system provides a navigation plan for an autonomous vehicle that leads to decreasing the traveling time and distance of the autonomous vehicle. For example, if the disclosed system determines that a stopped vehicle at the railroad crossing is broken down, the autonomous vehicle may pass the stopped vehicle and change to another lane instead of getting stuck behind the stopped vehicle. In another example, if the disclosed system determines that a railroad crossing is closed, the autonomous vehicle may re-route to avoid the closed railroad crossing to avoid getting stuck at the closed railroad crossing. The autonomous vehicle may inform other autonomous vehicles and an oversight server about the closed railroad crossing. For example, map data may be updated to reflect the closed railroad crossing and communicated to autonomous vehicles. Furthermore, the other autonomous vehicles may plan ahead of time and determine an appropriate re-routing plan to reach their respective destinations.

In another example, the disclosed system may determine a target lane before crossing a railroad crossing. The target lane is a lane that provides available and sufficient space with at least a length of the autonomous vehicle on the other side of the railroad as opposed to a side of the railroad where the autonomous vehicle is currently traveling. For example, if traffic on the other side of the railroad crossing occupies a particular lane so that if the autonomous vehicle were to cross the railroad using the particular lane, at least a portion of the autonomous vehicle would be stuck in the middle of the railroad, the particular lane would not be the target lane. By determining the target lane and instructing the autonomous vehicle to travel on the target lane before crossing the railroad, the system provides a safer driving experience for the passing train, autonomous vehicle, other vehicles around railroad crossings, and pedestrians. In this way, the disclosed system improves autonomous vehicle navigation technology.

Autonomous Vehicle Navigation Plan for Crossing a Railroad Crossing

This disclosure contemplates systems and methods for implementing a navigation plan for an autonomous vehicle to cross a railroad crossing where no train is approaching or traveling through the railroad crossing.

In one embodiment, a system comprises a memory and a control device. The memory is configured to store sensor data that provides information about an environment in front of an autonomous vehicle. The control device is associated with the autonomous vehicle. The control device comprises a processor that is operably coupled to the memory. The processor receives the sensor data from at least one sensor associated with the autonomous vehicle. The processor detects that the autonomous vehicle is approaching a railroad crossing based at least in part upon the sensor data. The processor determines a target lane to travel while crossing the railroad, wherein the target lane is a lane that has available space with at least a length of the autonomous vehicle on another side of the railroad as opposed to a side of the railroad where the autonomous vehicle is currently traveling. The processor instructs the autonomous vehicle to travel on the target lane. The processor determines that no train is approaching the railroad crossing from the sensor data, wherein determining that no train is approaching the railroad crossing comprises determining that crossing arms associated with the railroad are positioned vertically. The processor instructs the autonomous vehicle to travel toward the railroad. The processor determines whether the target lane still provides available space with at least the length of the autonomous vehicle on the other side of the railroad. In response to determining that the target lane still provides available space with at least the length of the autonomous vehicle on the other side of the railroad, the processor instructs the autonomous vehicle to cross the railroad.

Autonomous Vehicle Navigation Plan in Response to an Oncoming Train on a Railroad This disclosure further contemplates systems and methods for implementing a navigation plan for an autonomous vehicle in response to detecting an oncoming train approaching a railroad crossing.

In one embodiment, a system comprises a memory and a control device. The memory is configured to store sensor data that provides information about an environment in front of an autonomous vehicle. The control device is associated with the autonomous vehicle. The control device comprises a processor operably coupled to the memory. The processor receives the sensor data from at least one sensor associated with the autonomous vehicle. The processor detects that the autonomous vehicle is approaching a railroad crossing based at least in part upon the sensor data. The processor determines a target lane to travel while crossing the railroad, wherein the target lane is a lane that has available space with at least a length of the autonomous vehicle on another side of the railroad as opposed to a side of the railroad where the autonomous vehicle is currently traveling. The processor instructs the autonomous vehicle to travel on the target lane. The processor determines that a train is approaching the railroad crossing from the sensor data, wherein determining that the train is approaching the railroad crossing comprises determining that crossing arms associated with the railroad are coming down or already at horizontal position. The processor instructs the autonomous vehicle to travel toward the railroad and stop within a threshold distance window from the railroad. The processor waits for the train to pass the railroad crossing. The processor determines that the train has passed the railroad crossing, wherein determining that the train has passed the railroad crossing comprises detecting that the sensor data comprises indicators indicating that the crossing arms have moved up to vertical position. The processor determines whether the target lane still provides available space with at least the length of the autonomous vehicle on the other side of the railroad. In response to determining that the target lane still provides available space with at least the length of the autonomous vehicle on the other side of the railroad, the processor instruct the autonomous vehicle to cross the railroad.

Autonomous Vehicle Navigation Plan in Response to a Closed Railroad Crossing

This disclosure further contemplates systems and methods for implementing a navigation plan for an autonomous vehicle in response to encountering a closed railroad crossing.

In one embodiment, a system comprises a memory and a control device. The memory is configured to store sensor data that provides information about an environment in front of an autonomous vehicle. The control device is associated with the autonomous vehicle. The control device comprises a processor operably coupled to the memory. The processor receives the sensor data from at least one sensor associated with the autonomous vehicle. The processor detects that the autonomous vehicle is approaching a railroad crossing based at least in part upon the sensor data. The processor determines that the railroad crossing is closed from the sensor data, wherein determining that the railroad crossing is closed comprises detecting a closed railroad crossing sign from the sensor data. The processor determines one or more re-routing options from map data, wherein the map data comprises at least a portion of a virtual map that shows routes that reach a predetermined destination of the autonomous vehicle. The processor determines whether at least one re-routing option from among the one or more re-routing options reaches the predetermined destination. In response to determining that the at least one re-routing option from among the one or more re-routing options reaches the predetermined destination, the processor selects a particular re-routing option from among the at least one re-routing option, wherein the particular re-routing option is selected based at least in part upon determining that the autonomous vehicle is able to travel according to the particular re-routing option autonomously. The processor instructs the autonomous vehicle to re-route according to the particular re-routing option.

Autonomous Vehicle Navigation Plan in Response to Stopped Vehicle at a Railroad Crossing This disclosure further contemplates systems and methods for implementing a navigation plan for an autonomous vehicle in response to detecting a stopped vehicle at a railroad crossing.

In one embodiment, a system comprises a memory and a control device. The memory is configured to store sensor data that provides information about an environment in front of an autonomous vehicle. The control device is associated with the autonomous vehicle. The control device comprises a processor operably coupled to the memory. The processor receives the sensor data from at least one sensor associated with the autonomous vehicle. The processor detects that the autonomous vehicle is approaching a railroad crossing based at least in part upon the sensor data. The processor determines that no train is approaching the railroad crossing from the sensor data, wherein determining that no train is approaching the railroad crossing comprises determining that crossing arms associated with the railroad are positioned vertically. The processor detects, from the sensor data, an indication of a stopped vehicle in front of the autonomous vehicle and behind the railroad crossing. The processor determines whether the stopped vehicle is associated with a mandatory stop rule, where determining whether the stopped vehicle is associated with the mandatory stop rule comprises waiting for a threshold period; determining whether the stopped vehicle moves forward by the threshold period; in response to determining that the stopped vehicle does not move forward by the threshold period, determining that the stopped vehicle is not associated with the mandatory stop rule; in response to determining that the stopped vehicle moves forward by the threshold period, determining that the stopped vehicle is associated with the mandatory stop rule. The mandatory stop rule indicates that vehicles carrying hazardous materials have to stop behind the railroad crossing even when no train is approaching or traveling through the railroad crossing. In response to determining that the stopped vehicle is associated with the mandatory stop rule, the processor waits behind the stopped vehicle until the stopped vehicle crosses the railroad crossing and instructs the autonomous vehicle to cross the railroad.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions to evaluate a situation where the autonomous vehicle detects a railroad crossing and to propose an appropriate navigation plan for the autonomous vehicle according to the experienced situation. The present disclosure provides various systems, methods, and devices to evaluate each situation where the autonomous vehicle detects a railroad crossing and proposes an appropriate navigation plan for the autonomous vehicle according to each experienced situation. Embodiments of the present disclosure and its advantages may be understood by referring to FIGS. 1 through 12. FIGS. 1 through 12 are used to describe a system and method to provide autonomous vehicle navigation plans for when 1) no train is approaching or traveling through a railroad crossing, 2) a train is approaching or traveling through a railroad crossing, 3) a closed railroad crossing is encountered, and 4) a stopped vehicle at a railroad crossing is detected.

System Overview

Figure 1:
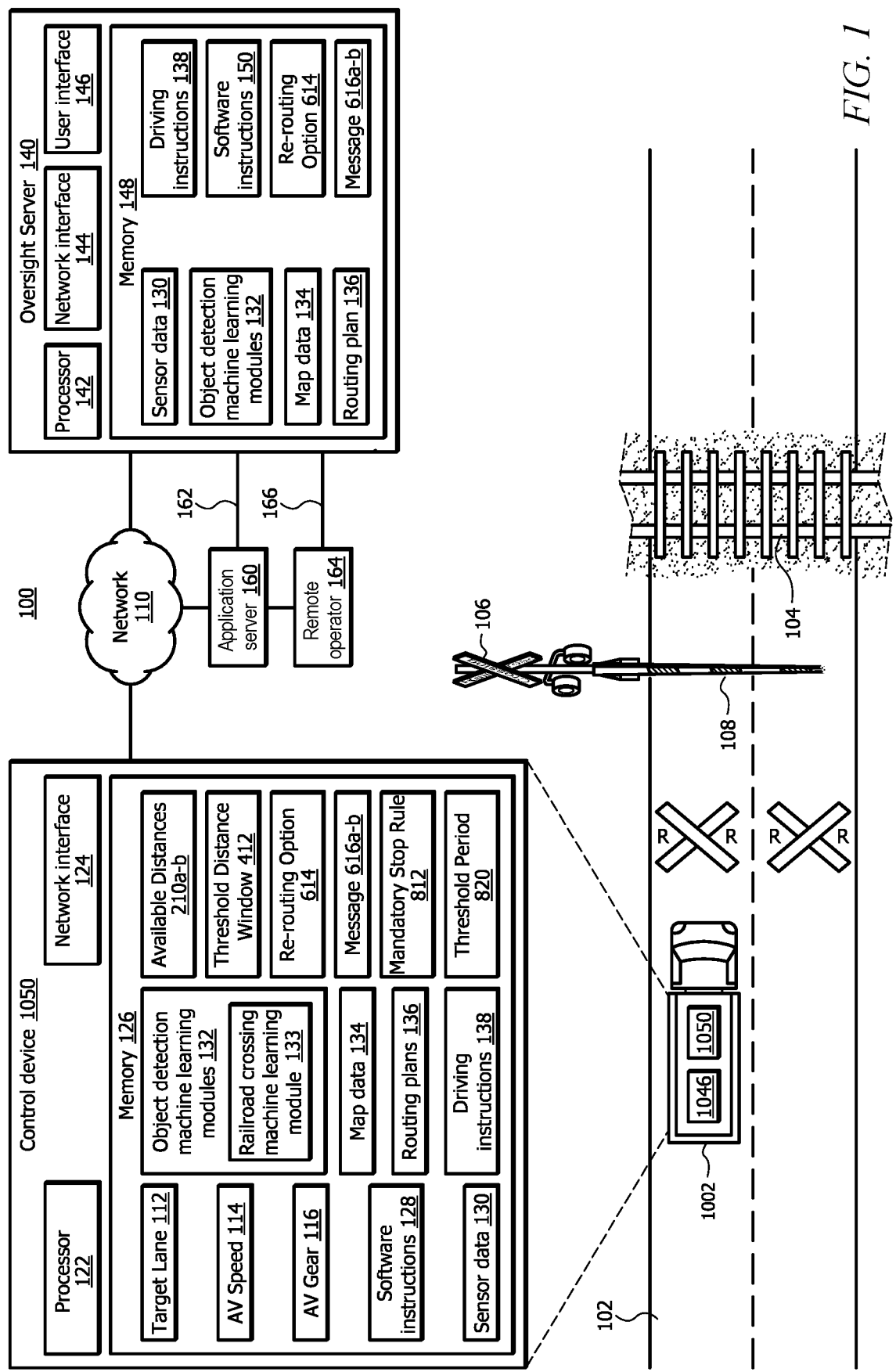
FIG. 1 illustrates an embodiment of a system configured to determine autonomous vehicle navigation in response to detecting a railroad crossing.

FIG. 1 illustrates an embodiment of a system 100 configured to determine a navigation plan for an autonomous vehicle 1002 when the autonomous vehicle 1002 encounters a railroad crossing in its path. FIG. 1 further illustrates a simplified schematic of a road 102 traveled by the autonomous vehicle 1002 where the autonomous vehicle 1002 encounters a railroad crossing 104 associated with a railroad, railways, and the like. In some cases, the railroad may support the traversal of a "light rail" that is a form of passenger urban rail transit characterized by a combination of tram and rapid transit features. In certain embodiments, the system 100 comprises an oversight server 140 communicatively coupled with one or more autonomous vehicles 1002 and an application server 160 via a network 110. Network 110 enables communication among the components of the system 100. Network 110 allows the autonomous vehicle 1002 to communicate with other autonomous vehicles 1002, systems, oversight server 140, application server 160, databases, devices, etc. Oversight server 140 comprises a processor 142 in signal communication with a memory 148. Memory 148 stores software instructions 150 that when executed by the processor 142 cause the oversight server 140 to perform one or more operations described herein. The autonomous vehicle 1002 comprises a control device 1050. The control device 1050 comprises a processor 122 in signal communication with a memory 126. Memory 126 stores software instructions 128 that when executed by the processor 122 cause the control device 1050 to perform one or more operations described herein. In other embodiments, system 100 may not have all of the components listed and/or may have other elements instead of, or in addition to, those listed above. System 100 may be configured as shown or in any other configuration.

In general, the system 100 improves autonomous vehicle navigation in cases where the autonomous vehicle 1002 detects a railroad crossing 104 on its traveling path. The current autonomous vehicle navigation technology lacks the capability to evaluate a situation where the autonomous vehicle 1002 detects a railroad crossing 104 and is unable to propose a navigation plan for the autonomous vehicle according to the experienced situation. In some cases, the autonomous vehicle 1002 may encounter a railroad crossing where no train is approaching or traveling through the railroad crossing. The navigation plan by which the autonomous vehicle 1002 is navigated in such situations is described in great detail in the discussion of FIGS. 2 and 3. In some cases, the autonomous vehicle 1002 may encounter a railroad crossing where a train is approaching or traveling through the railroad crossing. The navigation plan by which the autonomous vehicle 1002 is navigated in such situations is described in great detail in the discussion of FIGS. 4 and 5. In some cases, the autonomous vehicle 1002 may encounter a closed railroad crossing (e.g., out of service or unpassable railroad crossing). The navigation plan by which the autonomous vehicle 1002 is navigated in such situations is described in great detail in the discussion of FIGS. 6 and 7.

In some cases, the autonomous vehicle 1002 may encounter a stopped vehicle at a railroad crossing even though no train is approaching or traveling through the railroad crossing. The navigation plan by which the autonomous vehicle 1002 is navigated in such situations is described in great detail in the discussion of FIGS. 8 and 9.

The system 100 is configured to evaluate such situations and determine an appropriate navigation plan for the autonomous vehicle 1002. Therefore, the system 100 is integrated into a practical application of improving autonomous vehicle navigation in general, and more specifically, in situations where the autonomous vehicle 1002 encounters a railroad crossing 1004 on its traveling path. This, in turn, provides an additional practical application of providing a safer driving experience for autonomous vehicles 1002, other vehicles around railroad crossings, and pedestrians.

In some cases, the system 100 provides a navigation plan for an autonomous vehicle 1002 that leads to decreasing the traveling time and distance of the autonomous vehicle. For example, if the control device 1050 of the autonomous vehicle 1002 determines that a stopped vehicle at the railroad crossing is broken down, the autonomous vehicle 1002 may pass the stopped vehicle and change to another lane instead of getting stuck behind the stopped vehicle. In another example, if the control device 1050 of the autonomous vehicle 1002 determines that a railroad crossing is closed, the autonomous vehicle 1002 may re-route to avoid the closed railroad crossing to avoid getting stuck at the closed railroad crossing. The autonomous vehicle 1002 may inform other autonomous vehicles 1002 and the oversight server 140 about the closed railroad crossing. For example, map data may be updated to reflect the closed railroad crossing and communicated to autonomous vehicles 1002. Furthermore, the other autonomous vehicles 1002 may plan ahead of time and determine an appropriate re-routing plan to reach their respective destinations. In another example, the control device 1050 of an autonomous vehicle 1002 may determine a target lane before crossing a railroad crossing 1004. The target lane is a lane that provides sufficient and available space with at least a length of the autonomous vehicle 1002 on the other side of the railroad as opposed to a side of the railroad where the autonomous vehicle 1002 is currently traveling. For example, if traffic on the other side of the railroad crossing occupies a particular lane so that if the autonomous vehicle 1002 were to cross the railroad using the particular lane, at least a portion of the autonomous vehicle 1002 would be stuck in the middle of the railroad, the particular lane would not be the target lane. By determining the target lane and instructing the autonomous vehicle 1002 to travel on the target lane before crossing the railroad, the system 100 provides a safer driving experience for the passing train, autonomous vehicles 1002, other vehicles around railroad crossings, and pedestrians. In this way, the system 100 improves the autonomous vehicle navigation technology.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 10:
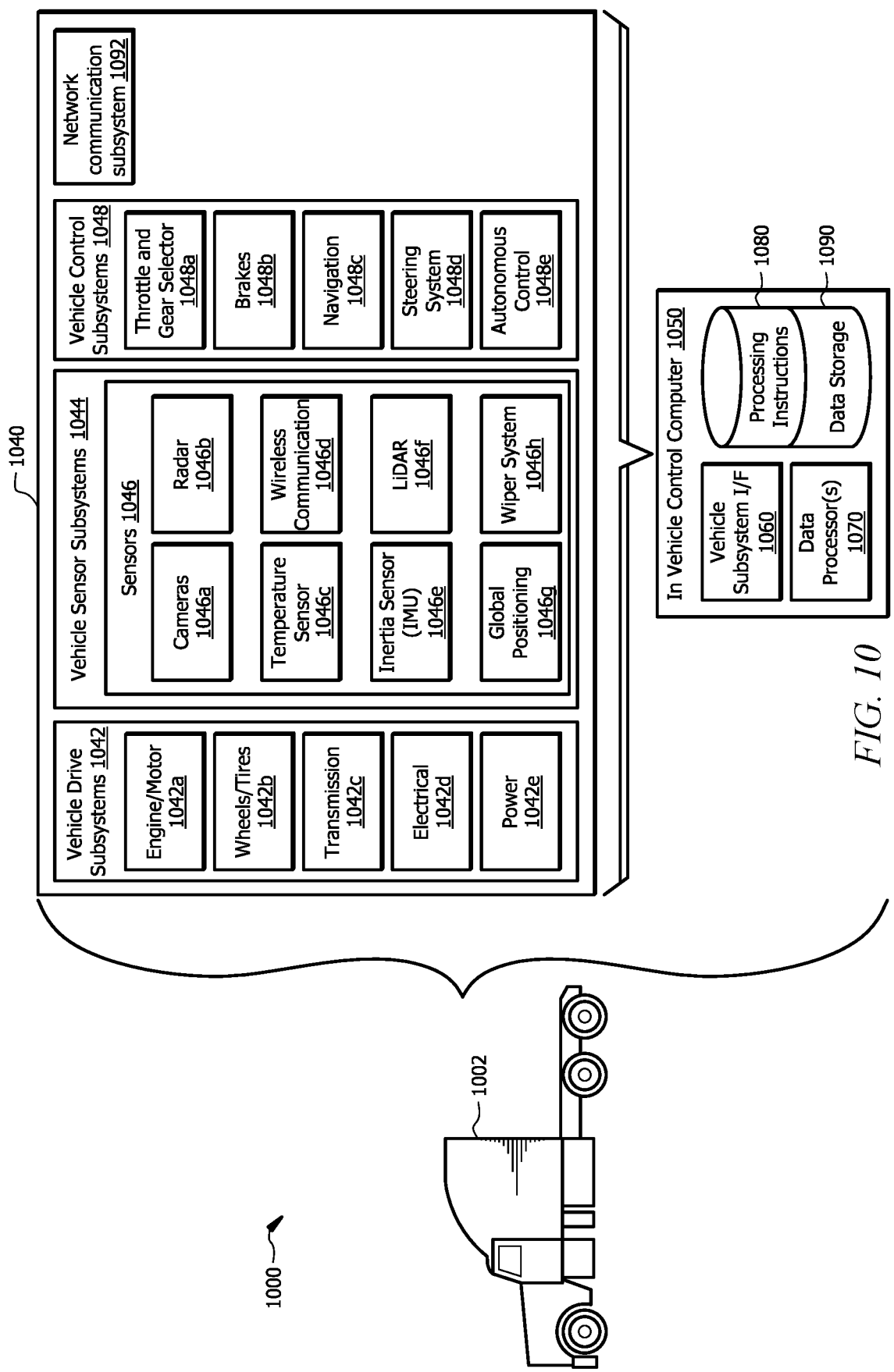
FIG. 10 illustrates a block diagram of an example autonomous vehicle configured to implement autonomous driving operations.

In one embodiment, the autonomous vehicle 1002 may include a semi-truck tractor unit attached to a trailer to transport cargo or freight from one location to another location (see FIG. 10). The autonomous vehicle 1002 is generally configured to travel along a road in an autonomous mode. The autonomous vehicle 1002 may navigate using a plurality of components described in detail in FIGS. 10-12. The operation of the autonomous vehicle 1002 is described in greater detail in FIGS. 10-12. The corresponding description below includes brief descriptions of certain components of the autonomous vehicle 1002.

Control device 1050 may be generally configured to control the operation of the autonomous vehicle 1002 and its components and to facilitate autonomous driving of the autonomous vehicle 1002. The control device 1050 may be further configured to determine a pathway in front of the autonomous vehicle 1002 that is safe to travel and free of objects or obstacles, and navigate the autonomous vehicle 1002 to travel in that pathway. This process is described in more detail in FIGS. 10-12. The control device 1050 may generally include one or more computing devices in signal communication with other components of the autonomous vehicle 1002 (see FIG. 10). In this disclosure, the control device 1050 may interchangeably be referred to as an in-vehicle control computer 1050.

The control device 1050 may be configured to detect objects on and around a road traveled by the autonomous vehicle 1002 by analyzing the sensor data 130 and/or map data 134. For example, the control device 1050 may detect objects on and around the road by implementing object detection machine learning modules 132. The object detection machine learning modules 132 may be implemented using neural networks and/or machine learning algorithms for detecting objects from images, videos, infrared images, point clouds, audio feed, Radar data, etc. The object detection machine learning modules 132 are described in more detail further below. The control device 1050 may receive sensor data 130 from the sensors 1046 positioned on the autonomous vehicle 1002 to determine a safe pathway to travel. The sensor data 130 may include data captured by the sensors 1046.

Sensors 1046 may be configured to capture any object within their detection zones or fields of view, such as landmarks, lane markers, lane boundaries, road boundaries, vehicles, pedestrians, road/traffic signs, among others. In some embodiments, the sensors 1046 may be configured to detect rain, fog, snow, and/or any other weather condition. The sensors 1046 may include a detection and ranging (LiDAR) sensor, a Radar sensor, a video camera, an infrared camera, an ultrasonic sensor system, a wind gust detection system, a microphone array, a thermocouple, a humidity sensor, a barometer, an inertial measurement unit, a positioning system, an infrared sensor, a motion sensor, a rain sensor, and the like. In some embodiments, the sensors 1046 may be positioned around the autonomous vehicle 1002 to capture the environment surrounding the autonomous vehicle 1002. See the corresponding description of FIG. 10 for further description of the sensors 1046.

Control Device

The control device 1050 is described in greater detail in FIG. 10. In brief, the control device 1050 may include the processor 122 in signal communication with the memory 126 and a network interface 124. The processor 122 may include one or more processing units that perform various functions as described herein. The memory 126 may store any data and/or instructions used by the processor 122 to perform its functions. For example, the memory 126 may store software instructions 128 that when executed by the processor 122 causes the control device 1050 to perform one or more functions described herein.

The processor 122 may be one of the data processors 1070 described in FIG. 10. The processor 122 comprises one or more processors operably coupled to the memory 126. The processor 122 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 may be communicatively coupled to and in signal communication with the network interface 124 and memory 126. The one or more processors may be configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-12. In some embodiments, the function described herein is implemented using logic units, FPGAs, ASICs, DSPs, or any other suitable hardware or electronic circuitry.

Network interface 124 may be a component of the network communication subsystem 1092 described in FIG. 10. The network interface 124 may be configured to enable wired and/or wireless communications. The network interface 124 may be configured to communicate data between the autonomous vehicle 1002 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol as would be appreciated by one of ordinary skill in the art.

The memory 126 may be one of the data storages 1090 described in FIG. 10. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-12 along with any other data, instructions, logic, rules, or code operable to implement the function(s) described herein when executed by processor 122. For example, the memory 126 may store software instructions 128, sensor data 130, object detection machine learning module 132, map data 134, routing plan 136, driving instructions 138, target lane 112, autonomous vehicle speed 114, autonomous vehicle gear 116, messages 616*a-b*, available distances 210*a-b*, threshold distance window 412, mandatory stop rule 812, re-routing option 614, threshold period 814, and/or any other data/instructions. The software instructions 128 include code that when executed by the processor 122 causes the control device 1050 to perform the functions described herein, such as some or all of those described in FIGS. 1-12. The memory 126 comprises one or more disks, tape drives, or solid-state drives, and may be used as an over-flow data storage device to store programs when such programs are selected for execution, and to store instructions and data that are read during program execution.

Object detection machine learning modules 132 may be implemented by the processor 122 executing software instructions 128, and may be generally configured to detect objects and obstacles from the sensor data 130. The object detection machine learning modules 132 may be implemented using neural networks and/or machine learning algorithms for detecting objects from any data type, such as images, videos, infrared images, point clouds, audio feed, Radar data, etc.

In some embodiments, the object detection machine learning modules 132 may be implemented using machine learning algorithms, such as Support Vector Machine (SVM), Naive Bayes, Logistic Regression, k-Nearest Neighbors, Decision Trees, or the like. In some embodiments, the object detection machine learning modules 132 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 132. The object detection machine learning modules 132 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, audio feed, Radar data, etc. labeled with object(s) in each sample data. The object detection machine learning modules 132 may be trained, tested, and refined by the training dataset and the sensor data 130. The object detection machine learning modules 132 use the sensor data 130 (which are not labeled with objects) to increase their accuracy of predictions in detecting objects. For example, supervised and/or unsupervised machine learning algorithms may be used to validate the predictions of the object detection machine learning modules 132 in detecting objects in the sensor data 130.

In certain embodiments, the object detection machine learning modules 132 may include a railroad crossing detection machine learning module 133 that is generally configured to detect railroad crossings from the sensor data 130.

The railroad crossing detection machine learning module 133 may be implemented by the processor 122 executing the software instructions 128.

In some embodiments, the railroad crossing detection machine learning module 133 may be implemented using machine learning algorithms, such as SVM, Naive Bayes, Logistic Regression, k-Nearest Neighbors, Decision Trees, or the like. In some embodiments, the railroad crossing detection machine learning module 133 may utilize a plurality of neural network layers, convolutional neural network layers, LSTM layers, Bi-directional LSTM layers, recurrent neural network layers, and/or the like, in which weights and biases of these layers are optimized in the training process of the railroad crossing detection machine learning module 133. For example, the railroad crossing detection machine learning module 133 may be trained by a training dataset that comprises a repository of multiple sample data each labeled with a respective indication of a railroad crossing. In one example, the training dataset may include a repository of images of trains, railcars, boxcars, tank cars, shipping containers, and the like, from different angles (e.g., augmented images), each labeled with a respective indication of a railroad crossing. In another example, the training dataset may include a repository of images of railroads from different angles (e.g., augmented images), each labeled with a respective indication of a railroad crossing. In another example, the training dataset may include a repository of images of railroad crossings including railroad crossing signs, railroad crossing lights, and/or crossing arms from different angles (e.g., augmented images), each labeled with a respective indication of a railroad crossing. In another example, the training dataset may include a repository of images and/or videos showing particular flashing pattern of railroad crossing lights, each labeled with a respective indication indicating whether it means it is safe to cross the railroad crossing or not. In another example, the training dataset may include a repository of any type of visual sample data that indicate a presence of a railroad crossing. In another example, the training dataset may include a repository of auditory sample data that indicate a presence of a railroad crossing, where the auditory cues include train horn sound sample data, alarm sound sample data associated with an alarm sound-making equipment associated with the railroad crossing each labeled with a respective indication of a railroad crossing and whether it means it is safe to cross the railroad crossing or not. In this way, the control device 1050 is configured to differentiate between the train horn with any other horn sounds, such as car horns. In another example, the training dataset may include a repository of visual and auditory sample data for a flagman or a person directing traffic at a railroad crossing, each labeled with a respective indication of a railroad crossing and whether it means it is safe to cross the railroad crossing or not. In another example, the training dataset may include a repository of visual and auditory sample data for railroad tracks and streetcar rail tracks to differentiate between railroad tracks and streetcar rail tracks.

Similarly, the training dataset may include samples of other data types, such as videos, infrared images, point clouds, Radar data, etc. labeled with an indication of a railroad crossing (and whether it means it is safe to cross the railroad crossing or not) in each sample data. The railroad crossing detection machine learning module 133 may be trained, tested, and refined by the training dataset and the sensor data 130. The railroad crossing detection machine learning module 133 uses the sensor data 130 (which are not labeled with indicators of railroad crossings) to increase the accuracy of predictions in detecting railroad crossings. For example, supervised and/or unsupervised machine learning algorithms may be used to validate the predictions of the railroad crossing detection machine learning module 133 in detecting railroad crossings from the sensor data 130. A similar operation may be performed to improve the prediction of determining whether a sensor data 130 includes data that indicates whether it is safe to cross the railroad crossing.

In certain embodiments, the railroad crossing detection machine learning module 133 may be configured to differentiate between active and inactive railroad crossings 104. An active railroad crossing 104 may be referred to as a railroad crossing 104 that is operational, i.e., allows vehicles to pass the railroad crossing 104 when no train is traveling through the railroad crossing and the railroad crossing intersection. An inactive railroad crossing 104 may be referred to as a railroad crossing 104 that is not operational, i.e., out of service, unpassable, or closed. For example, if the control device 1050 (e.g., via the railroad crossing detection machine learning module 133) determines that the sensor data 130 does not indicate a presence of a closed railroad crossing sign, it may determine that the railroad crossing 104 is active. Otherwise, the control device 1050 may determine that the railroad crossing 104 is inactive. To differentiate between active and inactive railroad crossings, the training dataset may include a repository of visual, auditory, and other data format sample data, each labeled with a respective indication of an active or inactive railroad crossing. The railroad crossing detection machine learning module 133 may be trained, tested, and refined by the training dataset and the sensor data 130. The railroad crossing detection machine learning module 133 uses the sensor data 130 (which are not labeled with active or inactive railroad crossings) to increase the accuracy of predictions in detecting the type of the railroad crossings. An example operation where the autonomous vehicle 1002 encounters a closed (i.e., inactive) railroad crossing is described in FIGS. 6-7.

Map data 134 may include a virtual map of a city or an area that includes the road traveled by an autonomous vehicle 1002. In some examples, the map data 134 may include the map 1158 and map database 1136 (see FIG. 11 for descriptions of the map 1158 and map database 1136). The map data 134 may include drivable areas, such as roads, paths, highways, and undrivable areas, such as terrain (determined by the occupancy grid module 1160, see FIG. 11 for descriptions of the occupancy grid module 1160). The map data 134 may specify location coordinates of road signs, lanes, lane markings, lane boundaries, road boundaries, traffic lights, obstacles, etc.

Routing plan 136 may be a plan for traveling from a start location (e.g., a first autonomous vehicle launchpad/landing pad) to a destination (e.g., a second autonomous vehicle launchpad/landing pad). For example, the routing plan 136 may specify a combination of one or more streets, roads, and highways in a specific order from the start location to the destination. The routing plan 136 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 136 may include other information about the route from the start position to the destination, such as road/traffic signs in that routing plan 136, etc.

Figure 11:
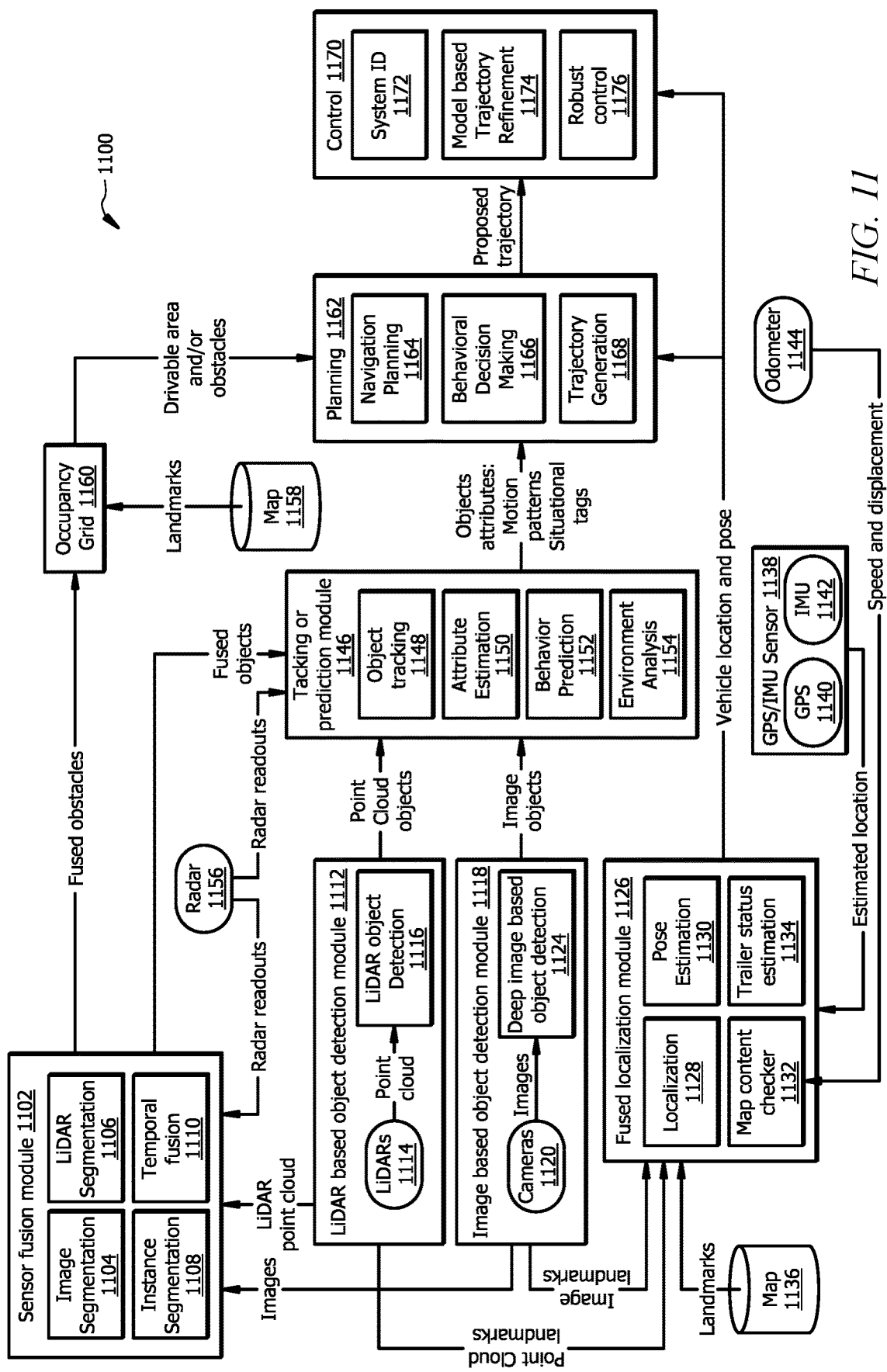
FIG. 11 illustrates an example system for providing autonomous driving operations used by the autonomous vehicle of FIG. 10.

Driving instructions 138 may be implemented by the planning module 1162 (See descriptions of the planning module 1162 in FIG. 11.). The driving instructions 138 may include instructions and rules to adapt the autonomous driving of the autonomous vehicle 1002 according to the driving rules of each stage of the routing plan 136. For example, the driving instructions 138 may include instructions to stay within the speed range of a road traveled by the autonomous vehicle 1002, adapt the speed of the autonomous vehicle 1002 with respect to observed changes by the sensors 1046, such as speeds of surrounding vehicles, objects within the detection zones of the sensors 1046, etc.

Oversight Server

Oversight server 140 may include one or more processing devices and is generally configured to oversee the operations of the autonomous vehicle 1002 while they are in transit and oversee the traveling of the autonomous vehicle 1002. The oversight server 140 may provide software and/or hardware resources (e.g., map data 134, recommendations, feedback from the remote operator 164 on autonomous vehicle navigation, etc.) to the autonomous vehicles 1002. The oversight server 140 may comprise a processor 142, a network interface 144, a user interface 146, and a memory 148. The components of the oversight server 140 are operably coupled to each other. The processor 142 may include one or more processing units that perform various functions of the oversight server 140. The memory 148 may store any data and/or instructions used by the processor 142 to perform its functions. For example, the memory 148 may store software instructions 150 that when executed by the processor 142 cause the oversight server 140 to perform one or more functions described herein. The oversight server 140 may be configured as shown or in any other suitable configuration.

In one embodiment, the oversight server 140 may be implemented by a cluster of computing devices that may serve to oversee the operations of the autonomous vehicle 1002. For example, the oversight server 140 may be implemented by a plurality of computing devices using distributed computing and/or cloud computing systems. In another example, the oversight server 140 may be implemented by a plurality of computing devices in one or more data centers. As such, in one embodiment, the oversight server 140 may include more processing power than the control device 1050. The oversight server 140 is in signal communication with the autonomous vehicle 1002 and its components (e.g., the control device 1050).

Processor 142 comprises one or more processors. The processor 142 may be any electronic circuitry, including state machines, one or more CPU chips, logic units, cores (e.g., a multi-core processor), FPGAs, ASICs, or DSPs. The processor 142 may be a programmable logic device, a microcontroller, a microprocessor, or any suitable combination of the preceding. The processor 142 may be communicatively coupled to and in signal communication with the network interface 144, user interface 146, and memory 148. The one or more processors are configured to process data and may be implemented in hardware or software. For example, the processor 142 may be 8-bit, 16-bit, 32-bit, 64-bit or of any other suitable architecture. The processor 142 may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 150 to implement the functions disclosed herein, such as some or all of those described with respect to FIGS. 1-12. In some embodiments, the function described herein may be implemented using logic units, FPGAs, ASICs, DSPs, or any other suitable hardware or electronic circuitry.

Network interface 144 may be configured to enable wired and/or wireless communications of the oversight server 140. The network interface 144 may be configured to communicate data between the oversight server 140 and other devices, servers, autonomous vehicles 1002, systems, or domains. For example, the network interface 144 may comprise an NFC interface, a Bluetooth interface, a Zigbee interface, a Z-wave interface, an RFID interface, a WIFI interface, a LAN interface, a WAN interface, a PAN interface, a modem, a switch, and/or a router. The processor 142 may be configured to send and receive data using the network interface 144. The network interface 144 may be configured to use any suitable type of communication protocol as would be appreciated by one of ordinary skill in the art.

User interfaces 146 may include one or more user interfaces that are configured to interact with users, such as the remote operator 164. The remote operator 164 may access the oversight server 140 via the communication path 166. In certain embodiments, the user interfaces 146 may include peripherals of the oversight server 140, such as monitors, keyboards, mouse, trackpads, touchpads, microphones, webcams, speakers, and the like. In certain embodiments, the user interface 146 may include a graphical user interface, a software application, or a web application. The remote operator 164 may use the user interfaces 146 to access the memory 148 to review any data stored in the memory 148. The remote operator 164 may confirm, update, and/or override the routing plan 136 and/or any other data stored in memory 148.

Memory 148 may be volatile or non-volatile and may comprise ROM, RAM, TCAM, DRAM, and SRAM. The memory 148 may include one or more of a local database, cloud database, NAS, etc. Memory 148 may store any of the information described in FIGS. 1-12 along with any other data, instructions, logic, rules, or code operable to implement the function(s) described herein when executed by processor 142. For example, the memory 148 may store software instructions 150, sensor data 130, object detection machine learning module 132, map data 134, routing plan 136, driving instructions 138, re-routing options 614, messages 616a-b, and/or any other data/instructions. The software instructions 150 may include code that when executed by the processor 142 causes the oversight server 140 to perform the functions described herein, such as some or all of those described in FIGS. 1-12. The memory 148 comprises one or more disks, tape drives, or solid-state drives, and may be used as an over-flow data storage device, to store programs when such programs are selected for execution, and to store instructions and data that are read during program execution.

Application Server

The application server 160 may be any computing device configured to communicate with other devices, such as the oversight server 140, autonomous vehicles 1002, databases, systems, etc., via the network 110. The application server 160 may be configured to perform functions described herein and interact with the remote operator 164, e.g., via communication path 162 using its user interfaces. Examples of the application server 160 include, but are not limited to, desktop computers, laptop computers, servers, etc. In one example, the application server 160 may act as a presentation layer from which the remote operator 164 can access the oversight server 140. As such, the oversight server 140 may send the routing plan 136, sensor data 130, autonomous vehicle navigation in response to a railroad crossing 104, detection of a railroad crossing 104, railroad crossing type (e.g., active or inactive), target lane 112, and/or any other data/instructions to the application server 160, e.g., via the network 110. The remote operator 164, after establishing the communication path 162 with the application server 160, may review the received data and confirm, update, and/or override any of the routing plan 136, autonomous vehicle navigation in response to a railroad crossing 104, detection of a railroad crossing 104, railroad crossing type (e.g., active or inactive), target lane 112, re-routing option 614, for example. Similarly, the remote operator 164, after establishing the communication path 166 with the oversight server 140, may review and confirm, update, and/or override any of the routing plan 136, autonomous vehicle navigation in response to a railroad crossing 104, detection of a railroad crossing 104, railroad crossing type (e.g., active or inactive), target lane 112, re-routing option 614, for example. The oversight server 140 and the control device 1050 may learn from the feedback of the remote operator 164 to improve future determinations and autonomous vehicle navigations.

The remote operator 164 may be an individual who is associated with and has access to the oversight server 140. For example, the remote operator 164 may be an administrator that can access and view the information regarding the autonomous vehicle 1002, such as sensor data 130, driving instructions 138, routing plan 136, autonomous vehicle navigation in response to a railroad crossing 104, detection of a railroad crossing 104, railroad crossing type (e.g., active or inactive), target lane 112, and other information that is available on the memory 168. In one example, the remote operator 164 may access the oversight server 140 from the application server 160 that is acting as a presentation layer via the network 110.

Figure 2:
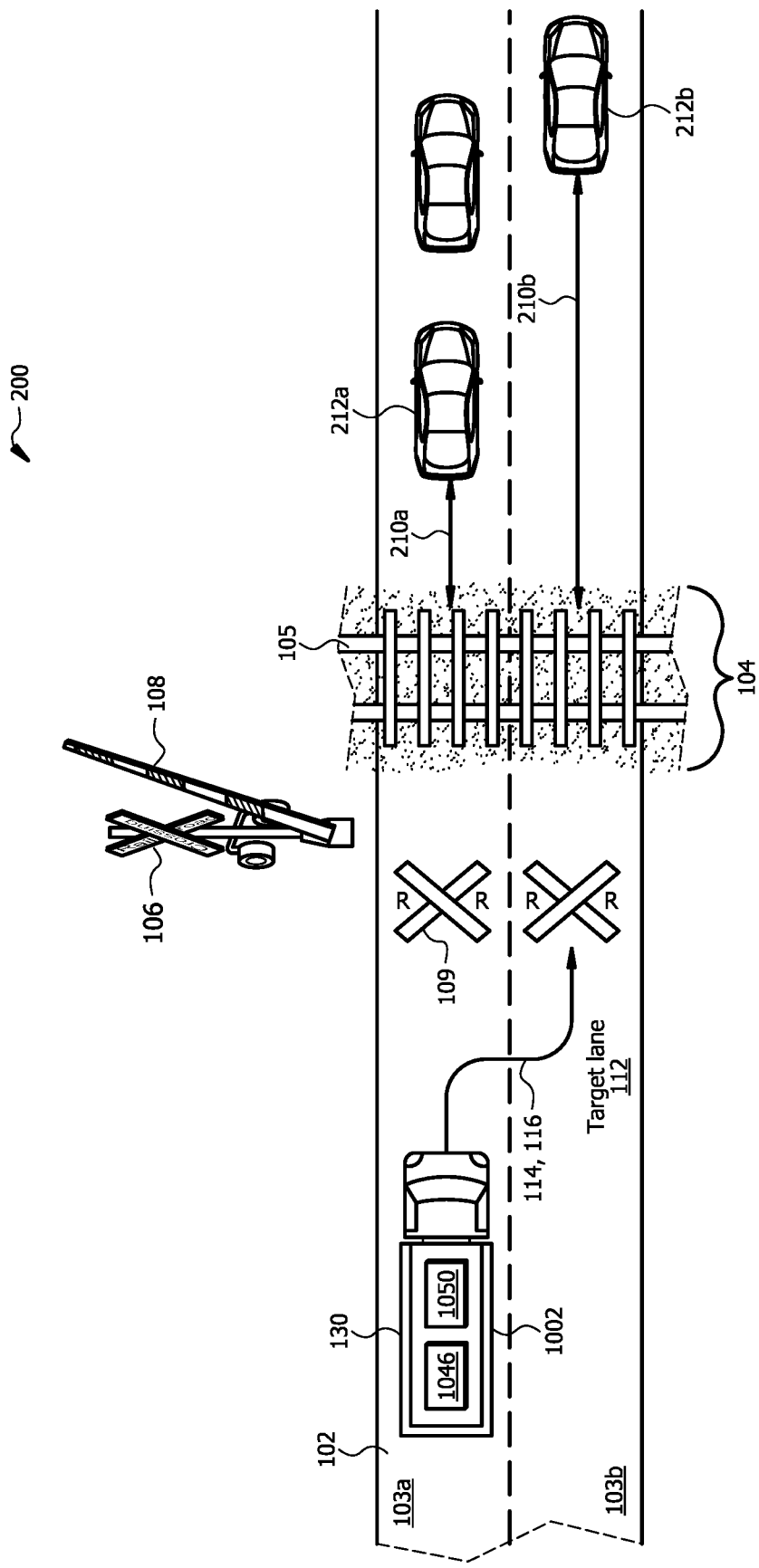
FIG. 2 illustrates an example operational flow of the system of FIG. 1 for autonomous vehicle navigation in response to a railroad crossing where no train is approaching.

Operational Flow for Autonomous Vehicle Navigation in Response to a Railroad Crossing Where No Train is Approaching FIG. 2 illustrates an example operational flow 200 of system 100 of FIG. 1 determining the navigation of an autonomous vehicle 1002 in response to detecting a railroad crossing 104 where no train is approaching. In an example scenario, assume that the autonomous vehicle 1002 is traveling along a road 102 where a railroad crossing 104 is located. The control device 1050 of the autonomous vehicle 1002 may receive sensor data 130 from the sensors 1046. For example, the control device 1050 may receive the sensor data 130 continuously, periodically (e.g., every second, every millisecond, etc.), or on demand.

The sensor data 130 may provide information about the environment surrounding the autonomous vehicle 1002. For example, the sensor data 130 may include locations of objects, road markings, lane markings, lane boundaries, and the like. For example, the sensor data 130 may include image data feed, audio data feed, Radar data feed, LiDAR data feed, infrared image data feed, and video data feed, among other types of data feed.

Detecting a Railroad Crossing

The control device 1050 may evaluate the sensor data 130 and detect if the autonomous vehicle 1002 is approaching a railroad crossing 104, similar to that described in FIG. 1 by implementing the railroad crossing detection machine learning module 133. For example, in this process, the control device 1050 may determine if the sensor data 130 includes one or more indications of the railroad crossing 104. The indications of the railroad crossing 104 may include a railroad crossing sign 106, a railroad crossing traffic light, crossing arms 108, barricades, railroad crossing markings 109 on the road 102, and any other indications of the railroad crossing 104. For example, if the sensor data 130 includes one or more indications of the railroad crossing 104, the control device 1050 may determine that the autonomous vehicle 1002 is approaching a railroad crossing 104. In the same or another example, the control device 1050 may determine that the autonomous vehicle 1002 is approaching the railroad crossing 104 in response to accessing the map data 134 (see FIG. 1) that includes location coordinates of objects on the road 102 and determining that the map data 134 (see FIG. 1) shows that the railroad crossing 104 is located at a particular location coordinate on the road 102.

The control device 1050 may use any number and combination of detection methods described above to determine whether a railroad crossing is detected. For example, the control device 1050 may use any number and combination of the detection methods described above to calculate a confidence score indicating whether a railroad crossing is detected. If the confidence score is determined to be more than a threshold percentage (e.g., more than 80%, 85%, etc.), the control device 1050 may determine that the railroad crossing 104 is detected.

Figure 6:
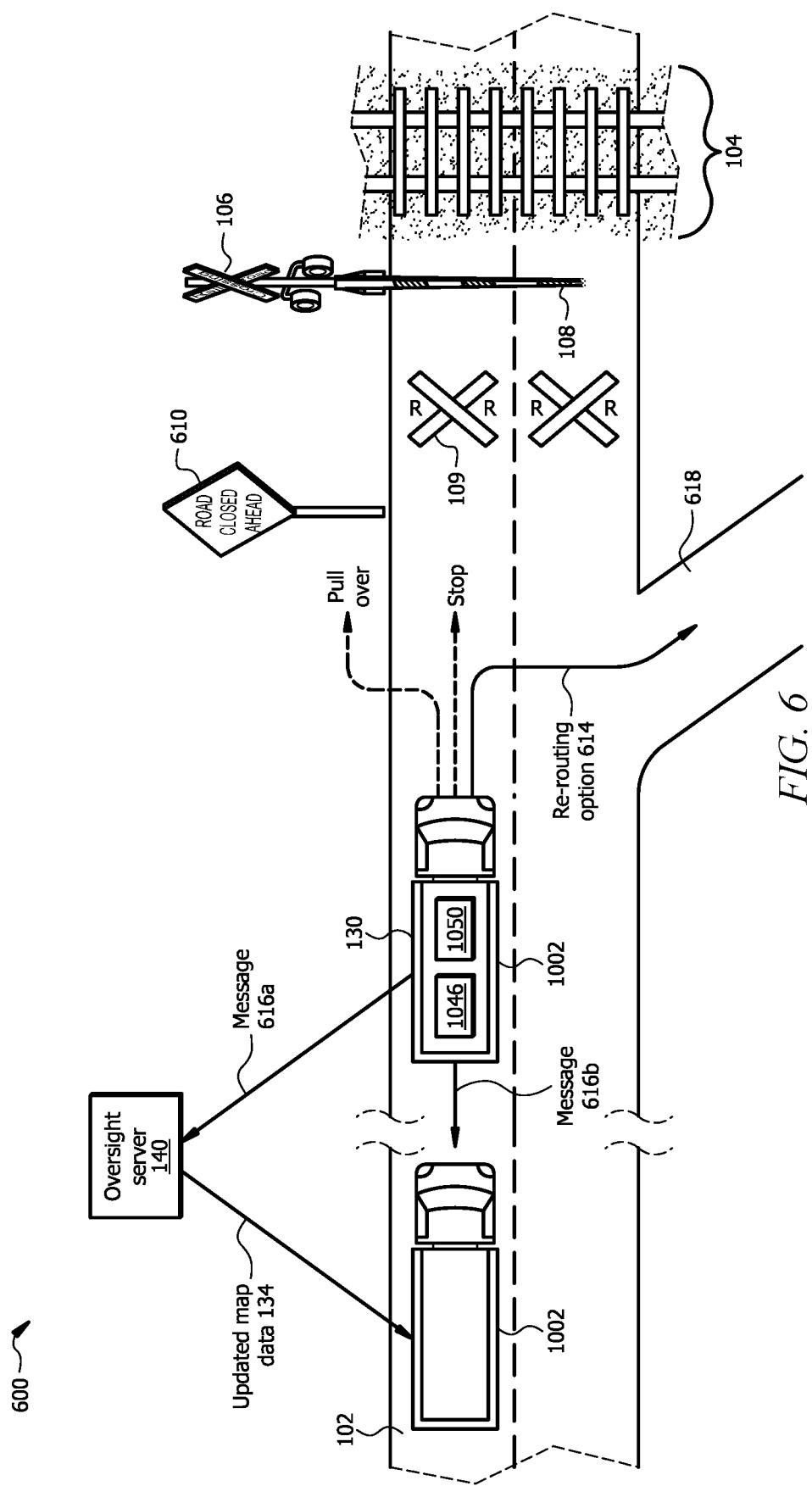
FIG. 6 illustrates an example operational flow of the system of FIG. 1 for autonomous vehicle navigation in response to a closed railroad crossing.

In response to determining that the autonomous vehicle 1002 is approaching the railroad crossing 104, the control device 1050 may determine whether the railroad crossing 104 is active or inactive, similar to that described in FIGS. 1 and 6 by implementing the railroad crossing detection machine learning module 133. For example, the control device 1050 may determine that the railroad crossing 104 is active if a closed railroad sign is not detected in the sensor data 130. In another example, the control device 1050 may determine that the railroad crossing 104 is not active if the control device 1050 determines that other vehicles are re-routing to avoid the closed railroad crossing. Other examples of detecting whether the railroad crossing 104 is active or inactive are described in FIG. 6.

In response to determining that the railroad crossing 104 is active, the control device 1050 may determine a target lane 112 for traveling while crossing the railroad. The target lane 112 is a lane that provides available space with at least a length of the autonomous vehicle 1002 on the other side of the railroad as opposed to a side of the railroad where the autonomous vehicle 1002 is currently traveling. For example, if traffic on the other side of the railroad crossing 104 occupies a particular lane so that if the autonomous vehicle 1002 were to cross the railroad on the particular lane, at least a portion of the autonomous vehicle 1002 would be stuck on the railroad, the particular lane would not be the target lane 112. To determine the target lane 112, the control device 1050 may perform one or more operations described below.

Determining a Target Lane

To determine the target lane 112, the control device 1050 may access and receive sensor data 130 that comprises indications of traffic on the other side of the railroad crossing 104. Additionally or alternatively, the control device 1050 may access the map data 134 (see FIG. 1) to determine the traffic on the other side of the railroad crossing 104. Additionally or alternatively, the control device 1050 may access crowed-sourced traffic data, live news reporting, live traffic reporting to determine the traffic on the other side of the railroad crossing 104.

In response, the control device 1050 may determine available distance from the railroad in each lane of the road 102 on the other side of the railroad crossing 104. In other words, the control device 1050 may determine available distance between the closest vehicle to the railroad and the railroad in each lane on the other side of the railroad crossing 104. In the illustrated example, the control device 1050 may determine the first available distance 210a between the vehicle 212a and the railroad 105 on the lane 103a, and the second available distance 210b between the vehicle 212b and the railroad 105 on the lane 103b.

The control device 1050 compares each of the determined available distances 210a and 210b with the length of the autonomous vehicle 1002. The control device 1050 determines which of the available distances 210a-b is greater than the length of the autonomous vehicle 1002. In this example, the control device 1050 determines that the available distance 210b is greater than the length of the autonomous vehicle 1002, and that the available distance 210a is less than the length of the autonomous vehicle 1002. In response, the control device 1050 may determine that the lane 103b is the target lane 112.

In certain embodiments, the control device 1050 may also identify a lane as a target lane 112 that leads to a predetermined destination of the autonomous vehicle 1002. To this end, the control device 1050 may access the map data 134 (see FIG. 1) that comprises a particular route (i.e., a routing plan 136 in FIG. 1) that reaches the predetermined destination of the autonomous vehicle 1002. The control device 1050 may also determine each route associated with each lane 103a-b on the other side of the road, e.g., by consulting the map data 134 (see FIG. 1). The control device 1050 may compare the route associated with each lane 103a-b with the routing plan 136 (see FIG. 1). Based on the comparison, the control device 1050 may select the target lane 112 that leads to the particular routing plan 136 (see FIG. 1) toward the predetermined destination of the autonomous vehicle 1002. For example, if the autonomous vehicle 1002 needs to turn right or take a right exit after crossing the railroad 105 according to a predetermined routing plan 136 (see FIG. 1), the target lane 112 may be the right lane 103b.

In certain embodiments, the control device 1050 may identify multiple target lane candidates, that each provides available space with at least the length of the autonomous vehicle 1002 on the other side of the railroad crossing 104, and also leads to the predetermined destination. The control device 1050 may select a particular target lane candidate from among the multiple target lane candidates that provides the most available space compared to the rest of the candidates, and provides a safer driving experience for the autonomous vehicle 1002, other vehicles, and pedestrians compare to other candidates.

In response to determining the target lane 112, the control device 1050 may instruct the autonomous vehicle 1002 to travel on the target lane 112. For example, if the autonomous vehicle 1002 is not already on the target lane 112 (such as the example shown in FIG. 2), the control device 1050 may instruct the autonomous vehicle 1002 to change to the target lane 112. The control device 1050 may also instruct the autonomous vehicle 1002 to slow down according to the traffic.

Determining that No Train is Approaching the Railroad Crossing

The control device 1050 may evaluate the sensor data 130 to determine whether a train is approaching the railroad crossing 104, e.g., by implementing the railroad crossing detection machine learning module 133 described in FIG. 1. In certain embodiments, the control device 1050 may determine whether a train is approaching the railroad crossing 104 based on evaluating the sensor data 130, train scheduling data, map data 134 (see FIG. 1), among others. In the example of FIG. 2, no train is approaching the railroad crossing 104. Therefore, the control device 1050 determines that no train is approaching the railroad crossing 104.

In certain embodiments, determining that no train is approaching the railroad crossing 104 may include determining that the sensor data 130 includes indications or data that indicate the crossing arms 108 are positioned vertically indicating that vehicles can pass the railroad crossing 104.

In certain embodiments, determining that no train is approaching the railroad crossing 104 may include determining that the signal lights associated with the railroad crossing 104 are indicating that no train is approaching the railroad crossing, e.g., when the signal lights are turned off or green.

In certain embodiments, determining that no train is approaching the railroad crossing 104 may include determining auditory cues or indicators that indicate no train is approaching the railroad crossing 104. The auditory cues may include an absence of a train horn, an absence of a bell sound associated with an alarm sound-making component that is associated with the railroad crossing 104, and an absence of verbal instructions (e.g., speech) of a flagman or a person directing traffic at the railroad crossing 104, among others.

In certain embodiments, determining that no train is approaching the railroad crossing 104 may include determining that the sensor data 130 does not include even one image showing at least a portion of a train. Similarly, in certain embodiments, determining that no train is approaching the railroad crossing 104 may include determining that the sensor data 130 does not include any data, such as infrared images, LiDAR data, Radar data, and video footage data showing or indicating even a portion of a train.

In certain embodiments, determining that no train is approaching the railroad crossing 104 may include determining that the map data 134 (see FIG. 1) and/or the train scheduling data includes information indicating that no train is scheduled to approach the railroad crossing 104 at the current time window.

The control device 1050 may use any number and combination of detection methods described above to determine whether or not a train is approaching the railroad crossing. For example, the control device 1050 may use any number and combination of the detection methods described above to calculate a confidence score indicating whether or not a train is approaching the railroad crossing. For example, if more than a threshold number (e.g., 9 out of 10) of the detection method results indicate that no train is approaching the railroad crossing, the control device 1050 determines that no train is approaching the railroad crossing and that it is safe to travel through the railroad crossing 104.

Crossing the Railroad Crossing

In response to confirming that no train is approaching the railroad crossing 104, the control device 1050 may instruct the autonomous vehicle 1002 to travel toward the railroad. The control device 1050 may also instruct the autonomous vehicle 1002 to slow down to a particular speed 114. The control device 1050 may determine the particular speed 114 based on terrain around the railroad crossing, weather conditions in an area surrounding the railroad crossing, road conditions on a traveling path of the autonomous vehicle 1002 toward the railroad crossing 104, and traffic at the railroad crossing 104, for example.

The control device 1050 (e.g., via the throttle and gear selector 1048a of FIG. 10) may also instruct the autonomous vehicle 1002 to change a gear of the autonomous vehicle 1002 to a desired gear 116 such that the control device 1050 does not have to change from the desired gear 116 to another gear while crossing the railroad. The control device 1050 may determine the desired gear 116 based on the terrain around the railroad crossing 104, weather conditions in an area surrounding the railroad crossing 104, road conditions on a traveling path of the autonomous vehicle 1002 toward the railroad crossing 104, the particular speed 114, and traffic at the railroad crossing 104, for example.

The control device 1050 determines whether the target lane 112 still provides available distance with at least the length of the autonomous vehicle 1002 on the other side of the railroad crossing 104. For example, as the autonomous vehicle 1002 is traveling toward the railroad crossing 104, the control device 1050 may periodically (e.g., every minute, every two minutes, etc.) determine whether the target lane 112 still provides available distance with at least the length of the autonomous vehicle 1002 on the other side of the railroad crossing 104. If it is determined that the target lane 112 still provides available distance with at least the length of the autonomous vehicle 1002 on the other side of the railroad crossing 104, the control device 1050 may instruct the autonomous vehicle 1002 to cross the railroad.

If it is determined that the target lane 112 no longer provides available distance with at least the length of the autonomous vehicle 1002 on the other side of the railroad crossing 104, the control device 1050 may instruct the autonomous vehicle 1002 to stop before entering the railroad crossing 104, wait until the target lane 112 provides available distance with at least the length of the autonomous vehicle 1002 on the other side of the railroad crossing 104 again, and then instruct the autonomous vehicle 1002 to cross the railroad.

Figure 3:
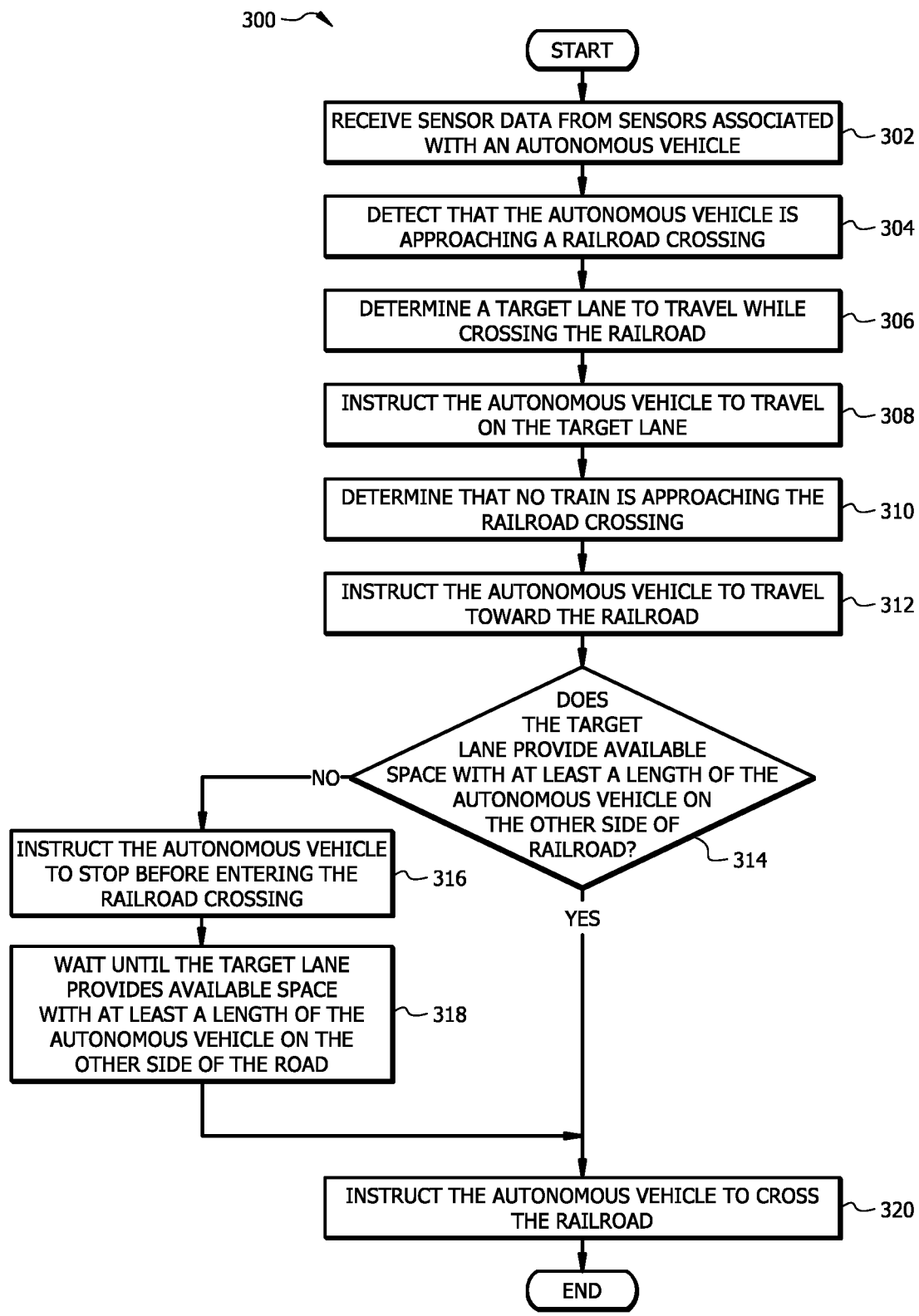
FIG. 3 illustrates an example flowchart of a method for autonomous vehicle navigation in response to a railroad crossing where no train is approaching.

Example Method for Autonomous Vehicle Navigation in Response to a Railroad Crossing Where No Train is Approaching FIG. 3 illustrates an example flowchart of a method 300 for autonomous vehicle navigation in response to a railroad crossing where no train is approaching. Modifications, additions, or omissions may be made to method 300. Method 300 may include more, fewer, or other operations. For example, operations may be performed in parallel or in any suitable order. While at times discussed as the system 100, autonomous vehicle 1002, control device 1050, or components of any of thereof performing operations, any suitable system or components of the system may perform one or more operations of the method 300. For example, one or more operations of method 300 may be implemented, at least in part, in the form of software instructions 128 and processing instructions 1080, respectively, from FIGS. 1 and 10, stored on non-transitory, tangible, machine-readable media (e.g., memory 126 and data storage 1090, respectively, from FIGS. 1 and 10) that when run by one or more processors (e.g., processors 122 and 1070, respectively, from FIGS. 1 and 10) may cause the one or more processors to perform operations 302-320.

At operation 302, the control device 1050 receives sensor data 130 from sensors 1046 associated with the autonomous vehicle 1002. For example, the control device 1050 may receive the sensor data 130 continuously, periodically (e.g., every second, every millisecond, etc.) or on demand.

At operation 304, the control device 1050 detects that the autonomous vehicle 1002 is approaching a railroad crossing 104. In this process, the control device 1050 may feed the sensor data 130 to the railroad crossing detection machine learning module 133 to determine whether the sensor data 130 includes any indication of a railroad crossing. Example detection railroad crossing methods are described in FIG. 2.

At operation 306, the control device 1050 determines a target lane 112 to travel while crossing the railroad. For example, the control device 1050 may determine the target lane 112 by evaluating available distances allowed by the traffic on each lane on the other side of the railroad, similar to that described in FIG. 2.

At operation 308, the control device 1050 instructs the autonomous vehicle 1002 to travel on the target lane 112. For example, the control device 1050 may implement vehicle subsystems 1040 (see FIG. 10) to instruct the autonomous vehicle to travel on the target lane 112.

At operation 310, the control device 1050 determines that no train is approaching the railroad crossing 104. For example, the control device 1050 (e.g., via the railroad crossing detection machine learning module 133) may determine that the sensor data 130 does not include any virtual and/or auditory and/or other types of cues that indicate no train is approaching, similar to that described in FIG. 2. At operation 312, the control device 1050 instructs the autonomous vehicle 1002 to travel toward the railroad, e.g., by implementing the vehicle subsystems 1040 (see FIG. 10).

At operation 314, the control device 1050 determines whether the target lane 112 still provides available space with at least the length of the autonomous vehicle 1002 on the other side of the railroad. For example, the control device 1050 may re-evaluate the target lane 112 to determine whether it still provides available space with at least the length of the autonomous vehicle 1002 on the other side of the railroad, similar to that described in FIG. 2. If it is determined that the target lane 112 still provides available space with at least the length of the autonomous vehicle 1002 on the other side of the railroad, method 300 proceeds to operation 320. Otherwise, method 300 proceeds to operation 316.

At operation 316, the control device 1050 instructs the autonomous vehicle 1002 to stop before entering the railroad crossing 104, for example, by gradually applying breaks 1048b (see FIG. 10). At operation 318, the control device 1050 waits until the target lane 112 again provides available space with at least the length of the autonomous vehicle 1002 on the other side of the railroad. At operation 320, the control device 1050 instructs the autonomous vehicle 1002 to cross the railroad, e.g., via the vehicle subsystems 1040 (see FIG. 10).

Figure 4:
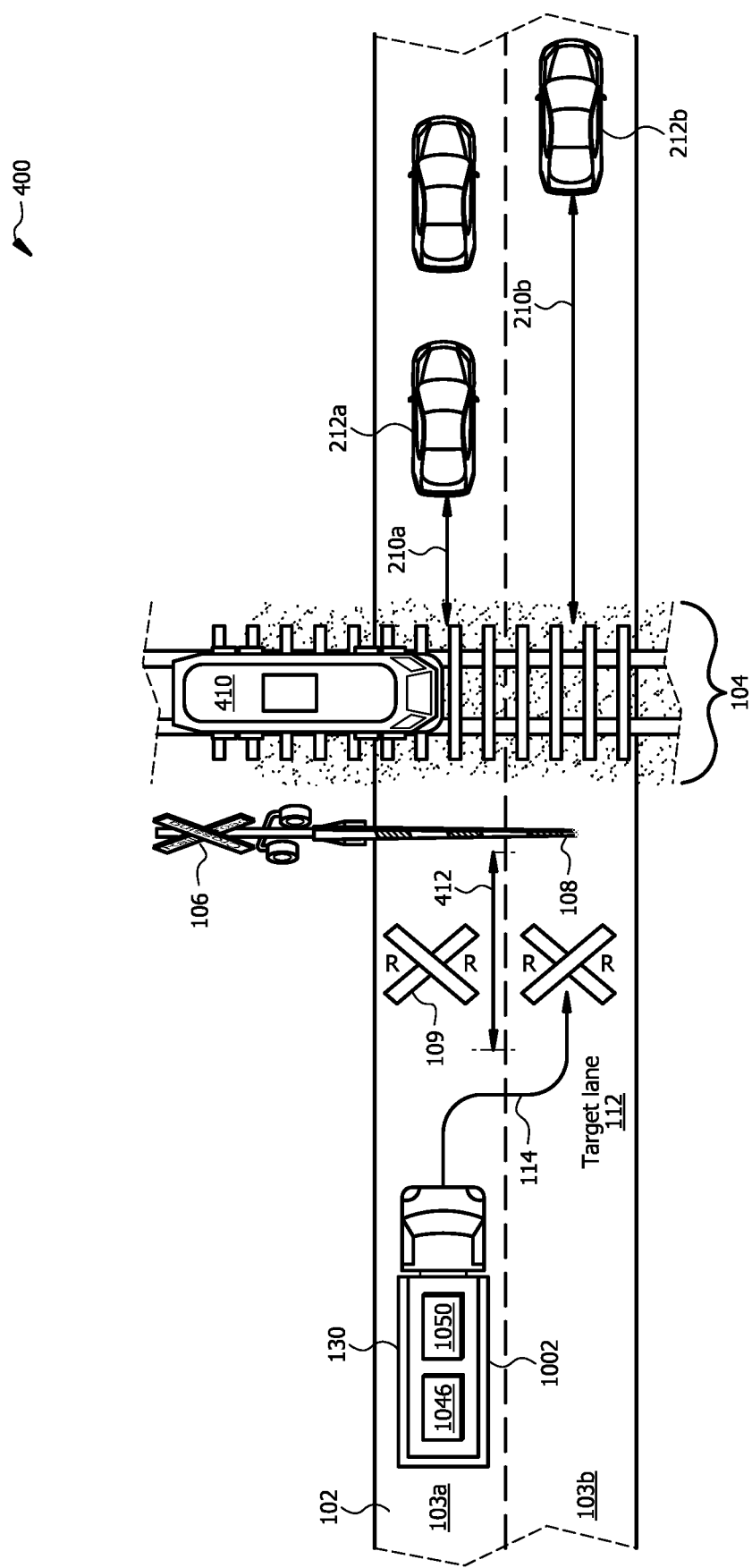
FIG. 4 illustrates an example operational flow of the system of FIG. 1 for autonomous vehicle navigation in response to a railroad crossing where a train is approaching.

Operational Flow for Autonomous Vehicle Navigation in Response to a Railroad Crossing Where a Train is Approaching FIG. 4 illustrates an example operational flow 400 of system 100 of FIG. 1 for navigation of an autonomous vehicle 1002 in response to detecting a railroad crossing 104 where a train 410 is approaching. Examples of the train 410 may include a passenger train, a cargo train, a railcar, a boxcar, a tank car, a shipping container, and the like. In an example scenario, assume that the autonomous vehicle 1002 is traveling along a road 102 where the railroad crossing 104 is located.

Detecting a Railroad Crossing and a Target Lane

The control device 1050 may detect the railroad crossing 104 by evaluating the sensor data 130, map data 134 (see FIG. 1), train schedule data, etc., similar to that described in FIG. 2. For example, the control device 1050 may implement the railroad crossing detection machine learning module 133, similar to that described in FIGS. 1 and 2.

Upon detecting that the autonomous vehicle 1002 is approaching the railroad crossing 104, the control device 1050 may determine whether the railroad crossing 104 is active or inactive, similar to that described in FIGS. 1 and 2, e.g., by implementing the railroad crossing detection machine learning module 133.

In response to determining that the railroad crossing 104 is active, the control device 1050 may determine a target lane 112 for traveling while crossing the railroad, similar to that described in FIG. 2. For example, the control device 1050 may determine the target lane 112 by evaluating available distances 210a-b between each vehicle 212a-b and the railroad crossing 104 on each lane on the other side of the railroad, similar to that described in FIG. 2.

In response to determining the target lane 112, the control device 1050 may instruct the autonomous vehicle 1002 to travel on the target lane 112. For example, if the autonomous vehicle 1002 is not already in the target lane 112 (such as the example shown in FIG. 4), the control device 1050 may instruct the autonomous vehicle 1002 to change to the target lane 112. The control device 1050 may also instruct the autonomous vehicle 1002 to slow down according to the traffic.

Determining that a Train is Approaching the Railroad Crossing

The control device 1050 may evaluate the sensor data 130 to determine whether a train is approaching the railroad crossing 104, e.g., by implementing the railroad crossing detection machine learning module 133 described in FIG. 1.

In certain embodiments, the control device 1050 may determine whether a train is approaching the railroad crossing 104 based on evaluating the sensor data 130, train scheduling data, map data 134 (see FIG. 1), among others.

In the example of FIG. 4, a train 410 is approaching the railroad crossing 104. Therefore, the control device 1050 determines that the train 410 is approaching the railroad crossing 104.

In certain embodiments, determining that the train 410 is approaching the railroad crossing 104 may include determining that the sensor data 130 includes indications or data that indicate the crossing arms 108 are coming down or already at a horizontal position indicating that the train 410 is approaching and the traffic should stop before the railroad crossing 104.

In certain embodiments, determining that the train 410 is approaching the railroad crossing 104 may include determining that the sensor data 130 includes indications or data that indicate the railroad signal lights associated with the railroad are indicating that a train is approaching the railroad crossing 104, e.g., when the signal lights are red and/or flashing periodically with a particular pattern.

In certain embodiments, determining that the train 410 is approaching the railroad crossing 104 may include determining that the sensor data 130 include auditory cues or data that indicate a train 410 is approaching the railroad crossing 104. The auditory data may include a train horn (or detecting that a train horn is getting louder), a bell sound associated with an alarm sound-making component associated with the railroad crossing 104, verbal instructions of a flagman or a person instructing the traffic at the railroad crossing 104 to stop, among others.

In certain embodiments, determining that the train 410 is approaching the railroad crossing 104 may include determining that the sensor data 130 includes at least one image that shows at least a portion of the train 410. Similarly, in certain embodiments, determining that the train 410 is approaching the railroad crossing 104 may include determining that the sensor data 130 includes any data, such as infrared images, LiDAR data, point cloud data, Radar data, video footage data, and the like showing or indicating at least a portion of the train 410.

In certain embodiments, determining that the train 410 is approaching the railroad crossing 104 may include determining that the sensor data 130 includes at least one piece of data (e.g., an image, an infrared image, a point cloud image data, a video frame, and/or the like) that indicates or shows a person or a flagman directing the traffic at the railroad crossing 104 to stop at the railroad crossing.

In certain embodiments, determining that the train 410 is approaching the railroad crossing 104 may include determining that the map data 134 (see FIG. 1) and/or the train scheduling data includes information indicating that the train 410 is scheduled to approach the railroad crossing 104 at the current time window.

The control device 1050 may use any number and combination of detection methods described above to determine whether or not a train is approaching the railroad crossing. For example, the control device 1050 may use any number and combination of the detection methods described above to calculate a confidence score indicating whether or not a train is approaching the railroad crossing. For example, if more than a threshold number (e.g., 9 out of 10) of detection method results indicate that the train 410 is approaching the railroad crossing 104, the control device 1050 confirms that train 410 is approaching the railroad crossing 104.

Yielding to the Train Traveling Through the Railroad Crossing

In response to confirming that the train 410 is approaching the railroad crossing 104, the control device 1050 may instruct the autonomous vehicle 1002 to travel toward the railroad and stop within a threshold distance window 412. For example, the control device 1050 may determine the location of the rail closest to the autonomous vehicle 1002 and instruct the autonomous vehicle 1002 to stop within 50 feet of, but not closer than 15 feet from the first rail of the railroad. In other examples, the threshold distance window 412 may be any suitable distance window that provides a safe distance between the autonomous vehicle 1002 and the railroad, and between the autonomous vehicle 1002 and the traffic.

The control device 1050 waits for the train 410 to pass the railroad crossing 104. The control device 1050 confirms whether the train 410 has passed the railroad crossing 104. In certain embodiments, determining that the train 410 has passed the railroad crossing 104 may include determining that the sensor data 130 include indicators (e.g., images, audio, video, point cloud data, LiDAR data, Radar data, and other data formats) indicating that the crossing arms 108 of the railroad crossing 104 have moved up to the vertical position, the signal lights are turned off or green, etc.

In certain embodiments, determining that the train 410 has passed the railroad crossing 104 may include determining that the sensor data 130 include determining that the sensor data 130 includes auditory cues or indicators that indicate the train 410 has passed the railroad crossing 104. The auditory indicators may include fading of a train horn sound, an absence of a bell sound associated with an alarm sound-making component associated with the railroad crossing 104 (e.g., the alarm sound-making component no longer makes the bell sound), verbal instructions of a flagman directing traffic at the railroad crossing to cross the railroad, among others.

In certain embodiments, determining that the train 410 has passed the railroad crossing 104 may include determining that the sensor data 130 include determining that the sensor data 130 includes data cues that indicate the train 410 has passed the railroad crossing 104. The data cues may include images, infrared images, video footage, point cloud data, Radar data, etc. For example, the data cues may include an absence of images showing at least a portion of the train 410, and/or an absence of any other data format type showing or indicating at least a portion of the train 410.

Navigating Across the Railroad Crossing

In response to determining that the train 410 has passed the railroad crossing 104, the control device 1050, may determine whether the target lane 112 still provides available distance 210*b* with at least the length of the autonomous vehicle 1002 on the other side of the railroad. In this process, the control device 1050 may re-evaluate the target lane 112 similar to that described in FIG. 2. If it is determined that the target lane 112 still provides available distance with at least the length of the autonomous vehicle 1002 on the other side of the railroad, the control device 1050 instructs the autonomous vehicle 1002 to cross the railroad. If it is determined that the target lane 112 no longer provides available distance with at least the length of the autonomous vehicle 1002 on the other side of the railroad crossing 104, the control device 1050 may instruct the autonomous vehicle 1002 to stop before entering the railroad crossing 104, wait until the target lane 112 provides available distance with at least the length of the autonomous vehicle 1002 on the other side of the railroad crossing 104, and then instruct the autonomous vehicle 1002 to cross the railroad.

Before instructing the autonomous vehicle 1002 to cross the railroad, the control device 1050 may also instruct the autonomous vehicle 1002 to slow down to a particular speed 114 and change to the desired gear 116, similar to that described in FIG. 2.

Figure 5:
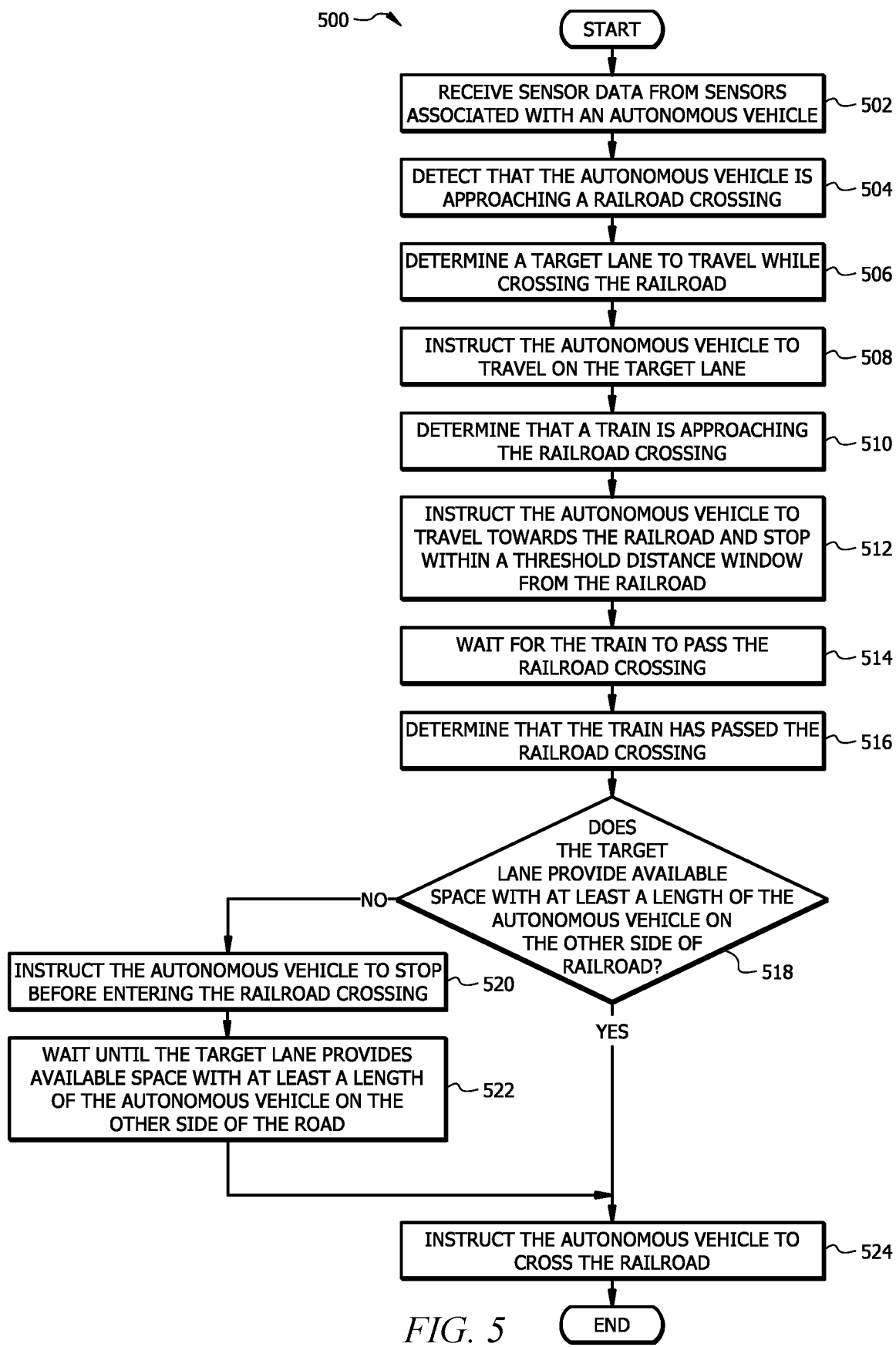
FIG. 5 illustrates an example flowchart of a method for autonomous vehicle navigation in response to a railroad crossing where a train is approaching.

Example Method for Autonomous Vehicle Navigation in Response to a Railroad Crossing Where a Train is Approaching FIG. 5 illustrates an example flowchart of a method 500 for autonomous vehicle navigation in response to a railroad crossing where a train is approaching. Modifications, additions, or omissions may be made to method 500. Method 500 may include more, fewer, or other operations. For example, operations may be performed in parallel or in any suitable order. While at times discussed as the system 100, autonomous vehicle 1002, control device 1050, or components of any of thereof performing operations, any suitable system or components of the system may perform one or more operations of the method 500. For example, one or more operations of method 500 may be implemented, at least in part, in the form of software instructions 128 and processing instructions 1080, respectively, from FIGS. 1 and 10, stored on non-transitory, tangible, machine-readable media (e.g., memory 126 and data storage 1090, respectively, from FIGS. 1 and 10) that when run by one or more processors (e.g., processors 122 and 1070, respectively, from FIGS. 1 and 10) may cause the one or more processors to perform operations 502-524.

At operation 502, the control device 1050 receives sensor data 130 from the sensors 1046 associated with the autonomous vehicle 1002. For example, the control device 1050 may receive the sensor data 130 continuously, periodically (e.g., every second, every millisecond, etc.) or on demand.

At operation 504, the control device 1050 detects that the autonomous vehicle 1002 is approaching a railroad crossing 104. In this process, the control device 1050 may feed the sensor data 130 to the railroad crossing detection machine learning module 133 to determine whether the sensor data 130 includes any indication of a railroad crossing. Example detection railroad crossing methods are described in FIG. 2.

At operation 506, the control device 1050 determines a target lane 112 to travel while crossing the railroad. For example, the control device 1050 may determine the target lane 112 by evaluating available distances allowed by the traffic in each lane on the other side of the railroad, similar to that described in FIG. 2.

At operation 508, the control device 1050 instructs the autonomous vehicle 1002 to travel on the target lane 112. For example, the control device 1050 may implement vehicle subsystems 1040 (see FIG. 10) to instruct the autonomous vehicle to travel on the target lane 112.

At operation 510, the control device 1050 determines that a train 410 is approaching the railroad crossing 104. For example, the control device 1050 (e.g., via the railroad crossing detection machine learning module 133) may determine that the sensor data 130 includes one or more virtual and/or auditory and/or other types of data cues that indicate a train is approaching, similar to that described in FIG. 4.

At operation 512, the control device 1050 instructs the autonomous vehicle 1002 to travel toward the railroad and stop within a threshold distance window 412. For example, the control device 1050 may determine the location of the first rail closest to the autonomous vehicle 1002 and instruct the autonomous vehicle 1002 to stop within 50 feet of, but not closer than 15 feet from the first rail of the railroad.

At operation 514, the control device 1050 waits for the train 410 to pass the railroad crossing 104. At operation 516, the control device 1050 determines that the train 410 has passed the railroad crossing 104. For example, the control device 1050 may determine that the train 410 has passed the railroad crossing 104 by evaluating the sensor data 130 to determine whether the sensor data 130 includes any indicators that indicate the train 410 has passed the railroad crossing 104, similar to that described in FIG. 4.

At operation 518, the control device 1050 determines whether the target lane 112 still provides available space with at least the length of the autonomous vehicle 1002 on the other side of the railroad. For example, the control device 1050 may re-evaluate the target lane 112 to determine whether it still provides available space with at least the length of the autonomous vehicle 1002 on the other side of the railroad, similar to that described in FIGS. 2 and 4. If it is determined that the target lane 112 still provides available space with at least the length of the autonomous vehicle 1002 on the other side of the railroad, method 500 proceeds to operation 524. Otherwise, method 500 proceeds to operation 520. At operation 520, the control device 1050 instructs the autonomous vehicle 1002 to stop before entering the railroad crossing 104, for example, by gradually applying breaks 1048*b* (see FIG. 10).

At operation 522, the control device 1050 waits until the target lane 112 again provides available space with at least the length of the autonomous vehicle 1002 on the other side of the railroad. At operation 524, the control device 1050 instructs the autonomous vehicle 1002 to cross the railroad, e.g., via the vehicle subsystems 1040 (see FIG. 10).

Operational Flow for Autonomous Vehicle Navigation in Response to a Closed Railroad Crossing FIG. 6 illustrates an example operational flow 600 of system 100 of FIG. 1 for navigation of an autonomous vehicle 1002 in response to detecting a closed railroad crossing 104. In an example scenario, assume that the autonomous vehicle 1002 is traveling along a road 102 where the railroad crossing 104 is located. The control device 1050 may detect the railroad crossing 104 by evaluating the sensor data 130, map data 134 (see FIG. 1), train schedule data, etc., similar to that described in FIG. 2. For example, the control device 1050 may implement the railroad crossing detection machine learning module 133, similar to that described in FIGS. 1 and 2.

Determining that the Railroad Crossing is Closed

Upon detecting that the autonomous vehicle 1002 is approaching the railroad crossing 104, the control device 1050 may determine whether the railroad crossing 104 is active or inactive, similar to that described in FIGS. 1 and 2, e.g., by implementing the railroad crossing detection machine learning module 133. In the example of FIG. 6, it is assumed that the map data 134 (see FIG. 1) has not been updated to indicate that the railroad crossing 104 is closed. In the example illustrated in FIG. 6, the control device 1050 determines that the railroad crossing 104 is inactive (i.e., closed).

In certain embodiments, the control device 1050 may determine that the railroad crossing 104 is closed by analyzing the sensor data 130 and determining that the sensor data 130 includes indicators that indicate the railroad crossing 104 is closed. For example, the control device 1050 may determine that the railroad crossing 104 is closed in response to determining that the sensor data 130 includes indicators (e.g., an image, a video footage, a point cloud data, a Radar data, a LiDAR data, and/or other data) that indicate the railroad crossing 104 is closed.

In one example, the control device 1050 may determine that the railroad crossing 104 is closed in response to detecting a closed railroad crossing sign 610 from the sensor data 130, e.g., an image, a video footage, a point cloud data, a Radar data, a LiDAR data, and/or other data in the sensor data 130 showing or indicating at least a portion of the closed railroad crossing sign 610. In some cases, the closed railroad crossing sign 610 may be after exit 618. In some cases, the closed railroad crossing sign 610 may be before the exit 618. The control device 1050 may be configured to detect the closed railroad crossing sign 610 when it is within a detection range of the sensors 1046.

In certain embodiments, determining that the railroad crossing 104 is closed comprises determining that the sensor data 130 does not include any indicating data that indicates the railroad crossing 104 is operational. The indicating data may include visual indicators, auditory indicators, point cloud indicators, Radar data indicators, and other data format indicators. For example, the indicating data may include an absence of signal lights associated with the railroad crossing 104, an absence of a train horn, or an absence of a bell sound associated with an alarm sound-making component associated with the railroad, among others in the sensor data 130, e.g., in images, infrared images, video feed, audio data, point cloud data, Radar data, etc. In certain embodiments, determining that the railroad crossing 104 is closed comprises determining that the sensor data 130 does not include any indicating data that indicates the railroad crossing 104 is operational for more than a threshold period (e.g., more than five minutes, ten minutes, or any other suitable duration).

In certain embodiments, determining that the railroad crossing 104 is closed comprises determining that the sensor data 130 includes indicating data that indicates the vehicles at the railroad crossing 104 are re-routing to avoid getting stuck at the railroad crossing 104, e.g., the vehicles are making U-turns, backing up, taking exits, etc. For example, the indicating data may include images or videos of vehicles at the railroad crossing 104 are re-routing. In other examples, the indicating data may include other data type formats that show or indicate that the vehicles at the railroad crossing 104 are re-routing.

In certain embodiments, determining that the railroad crossing 104 is closed may be in response to waiting for a threshold period (e.g., five minutes, ten minutes, fifteen minutes, etc.) before reaching the railroad crossing 104, and determining that no indication that indicates the railroad crossing 104 is operational is detected from the sensor data 130 during the threshold period. The indications may include signal lights of the railroad crossing 104 have started flashing, an alarm sound-making component associated with the railroad crossing 104 is making a sound, and a flagman started directing the traffic at the railroad crossing 104 to cross the railroad, among others.

In certain embodiments, the control device 1050 may communicate the result of its determination regarding the type of the railroad crossing 104 (e.g., closed or operational) to the oversight server 140. In certain embodiments, the oversight server 140 and/or the remote operator 164 may evaluate the determination of the control device 1050, confirm, override, or update the determination of the control device 1050, and communicate it to the control device 1050.

Determining Re-Routing Options

In response to determining that the railroad crossing 104 is closed, the control device 1050 may determine one or more re-routing options 614 based on the map data 134. The map data 134 may include at least a portion of a virtual map that shows routes that reach a predetermined destination of the autonomous vehicle 1002 among other routes.

The control device 1050 may determine whether any of the re-routing options 614 allow avoiding the closed railroad crossing 104, such as taking the exit 618. The control device 1050 may determine whether any of the re-routing options 614 reach the predetermined destination of the autonomous vehicle 1002, by evaluating each of the re-routing options 614.

The control device 1050 may identify re-routing option(s) 614 that reach the predetermined destination of the autonomous vehicle 1002. In response to determining that at least one re-routing option 614 reaches the predetermined destination, the control device 1050 may select a particular re-routing option 614 that leads to the predetermined destination of the autonomous vehicle 1002 such that the autonomous vehicle 1002 is able to travel according to the particular re-routing option 614 autonomously to reach the predetermined destination. Therefore, in certain embodiments, the particular re-routing option 614 may be selected based on determining that the autonomous vehicle 1002 is able to travel according to the particular re-routing option 614 autonomously.

In certain embodiments, the particular re-routing option 614 may be selected based on determining that the particular re-routing option 614 leads to the least traveling distance to reach the predetermined destination compared to the rest of the re-routing options 614. In certain embodiments, the particular re-routing option 614 may be selected based on determining that the particular re-routing option 614 leads to increasing a fuel-saving parameter to reach the predetermined destination compared to the rest of the re-routing options 614.

In certain embodiments, the control device 1050 may communicate the selected re-routing option 614 to the oversight server 140. The oversight server 140 may evaluate the selected re-routing option 614, confirm, override, or update the selected re-routing option 614, and communicate it to the control device 1050. In certain embodiments, the remote operator 164 may evaluate the selected re-routing option 614 and confirm, override, or update the selected re-routing option 614 and communicate it to the control device 1050. The oversight server 140 and the control device 1050 may learn from the feedback from the remote operator 164 for further re-routing option selections.

Upon determining and confirming the selected re-routing option 614, the control device 1050 instructs the autonomous vehicle 1002 to re-route according to the selected re-routing option 614. In the illustrated example, the selected re-routing option 614 is illustrated by taking the exit 618. In other examples, the selected re-routing option 614 may be another other traveling path.

Determining that None of the Re-Routing Options are Feasible

The control device 1050 may determine that a re-routing option 614 is feasible if it determines that the re-routing option 614 leads to the predetermined destination of the autonomous vehicle 1002 and/or the autonomous vehicle 1002 cannot travel according to any of the re-routing options 614 autonomously. In response to determining that none of the re-routing options 614 is feasible, the control device 1050 may instruct the autonomous vehicle 1002 to perform a minimal risk condition (MRC) maneuver. The minimal risk condition maneuver may include pulling the autonomous vehicle 1002 over to a side of the road 102 or stopping the autonomous vehicle 1002, e.g., by gradually applying breaks 1084b (see FIG. 10) at a suitable obstacle-free location such that the VA 1002 does not cause traffic or disturb traveling of other vehicles.

In response, the control device 1050 may communicate a message 616a to the oversight server 140. The message 616a may indicate that the autonomous vehicle 1002 is at the closed railroad crossing 104. The message 616a may include a request to dispatch a driver to the location coordinate (e.g., global positioning system (GPS) location coordinate) of the autonomous vehicle 1002 to drive the autonomous vehicle 1002 manually to a location where the autonomous vehicle 1002 can resume the autonomous driving toward the destination, or to a landing pad, or to the destination. The oversight server 140 may inform other autonomous vehicles 1002 about the closed railroad crossing 104. For example, the oversight server 140 may update the map data 134 to include that the railroad crossing 104 is closed, and communicate it to the autonomous vehicles 1002.

The control device 1050 may communicate messages 616b to other autonomous vehicle(s) 1002, e.g., that are following the autonomous vehicle 1002 and/or heading toward the closed railroad crossing 104, and that are within a wireless communication range (e.g., within WiFi or any other wireless protocol communication range) from the autonomous vehicle 1002. In certain embodiments, the message 616b may include the updated map data 134 that includes the railroad crossing 104 is closed. In this manner, the present disclosure implements vehicle-to-cloud (V2C), vehicle-to-cloud-to-vehicle (V2C2V), and vehicle-to-vehicle (V2V) communications. Thus, the other autonomous vehicles 1002 may plan accordingly and re-route, e.g., by taking an exit 618 or selecting a suitable re-routing option 614 to avoid getting stuck at the closed railroad crossing 104.

Figure 7:
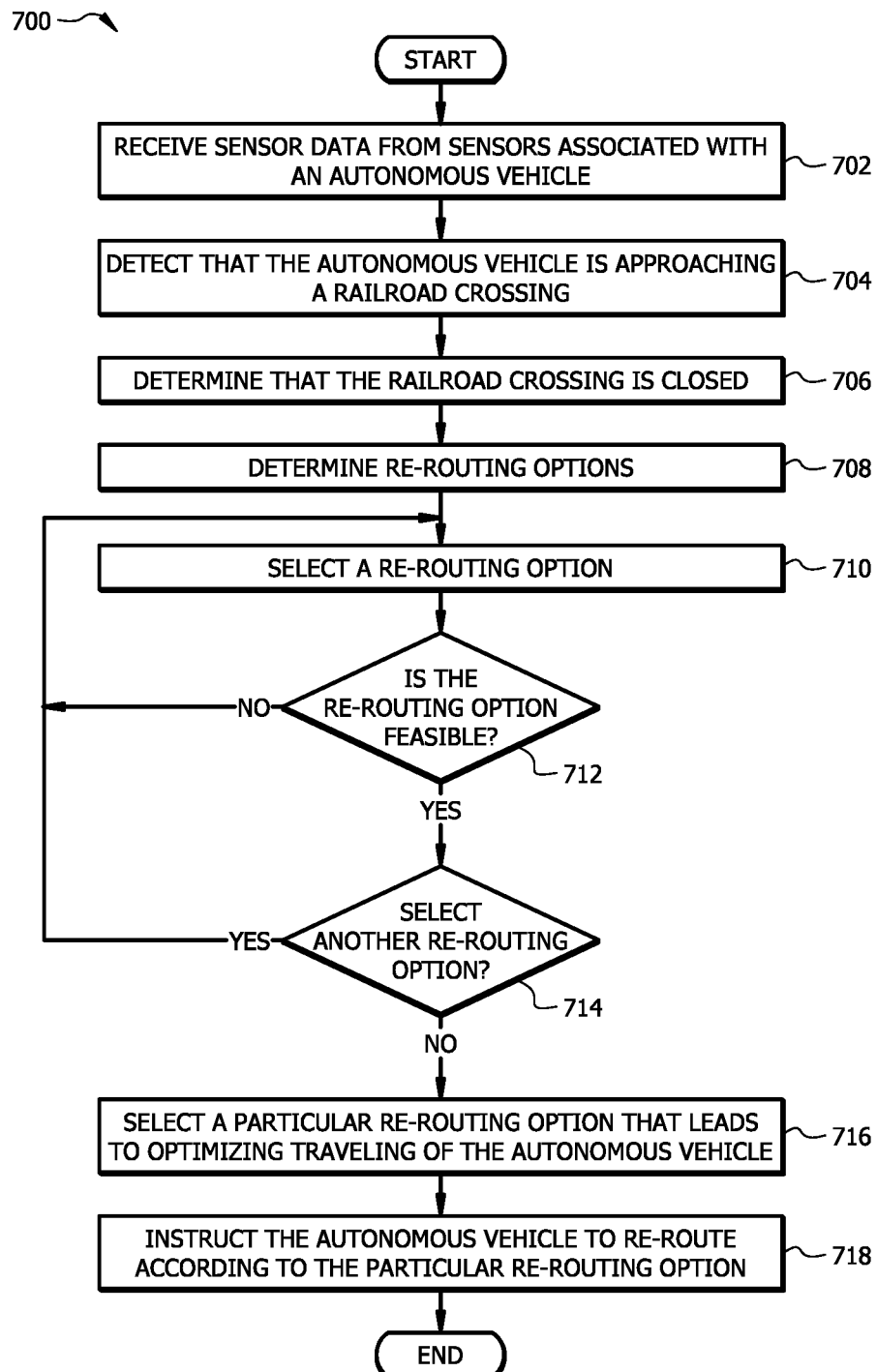
FIG. 7 illustrates an example flowchart of a method for autonomous vehicle navigation in response to a closed railroad crossing.

Example Method for Autonomous Vehicle Navigation in Response to a Closed Railroad Crossing FIG. 7 illustrates an example flowchart of a method 700 for autonomous vehicle navigation in response to a closed railroad crossing 104. Modifications, additions, or omissions may be made to method 700. Method 700 may include more, fewer, or other operations. For example, operations may be performed in parallel or in any suitable order. While at times discussed as the system 100, autonomous vehicle 1002, control device 1050, or components of any of thereof performing operations, any suitable system or components of the system may perform one or more operations of the method 700. For example, one or more operations of method 700 may be implemented, at least in part, in the form of software instructions 128 and processing instructions 1080, respectively, from FIGS. 1 and 10, stored on non-transitory, tangible, machine-readable media (e.g., memory 126 and data storage 1090, respectively, from FIGS. 1 and 10) that when run by one or more processors (e.g., processors 122 and 1070, respectively, from FIGS. 1 and 10) may cause the one or more processors to perform operations 702-718.

At operation 702, the control device 1050 receives sensor data 130 from the sensors 1046 associated with the autonomous vehicle 1002. For example, the control device 1050 may receive the sensor data 130 continuously, periodically (e.g., every second, every millisecond, etc.) or on demand.

At operation 704, the control device 1050 detects that the autonomous vehicle 1002 is approaching a railroad crossing 104. In this process, the control device 1050 may feed the sensor data 130 to the railroad crossing detection machine learning module 133 to determine whether the sensor data 130 includes any indication of a railroad crossing. Example detection railroad crossing methods are described in FIG. 2.

At operation 706, the control device 1050 determines that the railroad crossing 104 is closed. For example, the control device 1050 may determine that the railroad crossing 104 is closed if it is determined that the sensor data 130 includes images that show a closed railroad crossing sign 610. In other examples, the control device 1050 may determine that the railroad crossing 104 is closed if it is determined that sensor data 130 includes any other data format that show or indicate that the railroad crossing 104 is closed, e.g., indications of the closed railroad crossing sign 610. Other examples of detection methods for determining whether the railroad crossing 104 is closed or not are described in FIGS. 1, 2, 4, and 6.

At operation 708, the control device 1050 determines re-routing options 614. For example, the re-routing options 614 may be routes that allow avoiding the closed railroad crossing 104, such as taking the exit 618. The control device 1050 may determine the re-routing options 614 by analyzing the routes shown on the map data 134, similar to that described in FIG. 6. Examples of determining re-routing options 614 are described in FIG. 6.

At operation 710, the control device 1050 selects a re-routing option 614. The control device 1050 may iteratively select a re-routing option 614 until no re-routing option 614 is left for evaluation.

At operation 712, the control device 1050 determines whether the re-routing option 614 is feasible. The control device 1050 may determine that a re-routing option 614 is feasible if it determines that the re-routing option 614 leads to the predetermined destination of the autonomous vehicle 1002 and/or the autonomous vehicle 1002 can travel according to the re-routing option 614 autonomously. For example, if at least a portion of a re-routing option 614 is not pre-mapped in the map data 134 as a route that the autonomous vehicle 1002 is authorized to travel autonomously, the re-routing option 614 is outside of the operational design domain (ODD) of the autonomous vehicle 1002 and therefore may not be feasible.

At operation 714, the control device 1050 determines whether to select another re-routing option 614. The control device 1050 may determine to select another re-routing option 614 if at least one re-routing option 614 is left for evaluation. The determination to select another re-routing option 614 may be made based on various trip requirements in addition to or instead of the requirement that the route is within the ODD of the autonomous vehicle 1002, the various trip requirements including any of relative safety of the autonomous vehicle 1002 and surrounding vehicles, fuel efficiency, the estimated time to complete the travel to the intended terminal, and the like.

In some embodiments, a first re-routing option 614 that is within the ODD may be rejected, if, for example, the first re-routing option 614 does not lead to optimizing the various trip requirements described above, including relative safety of the autonomous vehicle and surrounding vehicles, fuel efficiency, the estimated time to complete the travel to the intended terminal, and the like. Thus, in certain embodiments, the control device 1050 may select a particular re-routing option 614 that is within the ODD of the autonomous vehicle 1002 as well as optimizing the various trip requirements described herein. The control device 1050 may evaluate every re-routing option 614 to determine which re-routing option 614 is a more optimal candidate that is within the ODD of the autonomous vehicle 1002 as well as optimizing the various trip requirements described herein. In certain embodiments, the determination to select a re-routing option 614 may be made based on various trip requirements in addition to or instead of the requirement that the route is within the ODD of the autonomous vehicle 1002. For example, a selected re-routing option 614 may lead to an overall optimized trip requirements described above even if the selected re-routing option 614 leads to manually driving some portion of the rest of trip (e.g., less than a threshold percentage traveling distance of the remaining of the trip, for example, less than 10%, 20%, etc.). In certain embodiments, in selection of the re-routing option 614, remaining within the ODD may be prioritized over the trip requirements, and vice versa.

At operation 716, the control device 1050 selects a particular re-routing option 614 that leads to optimizing the traveling of the autonomous vehicle 1002 (e.g., the trip requirements described above). For example, the control device 1050 may select a particular re-routing option 614 that leads to increasing a fuel-saving parameter to reach the predetermined destination, the least traveling distance to reach the predetermined destination, and providing a safer driving experience for the autonomous vehicle 1002 and other vehicles compared to the rest of the re-routing options 614.

At operation 718, the control device 1050 instructs the autonomous vehicle 1002 to re-route according to the particular re-routing option 614.

Figure 8:
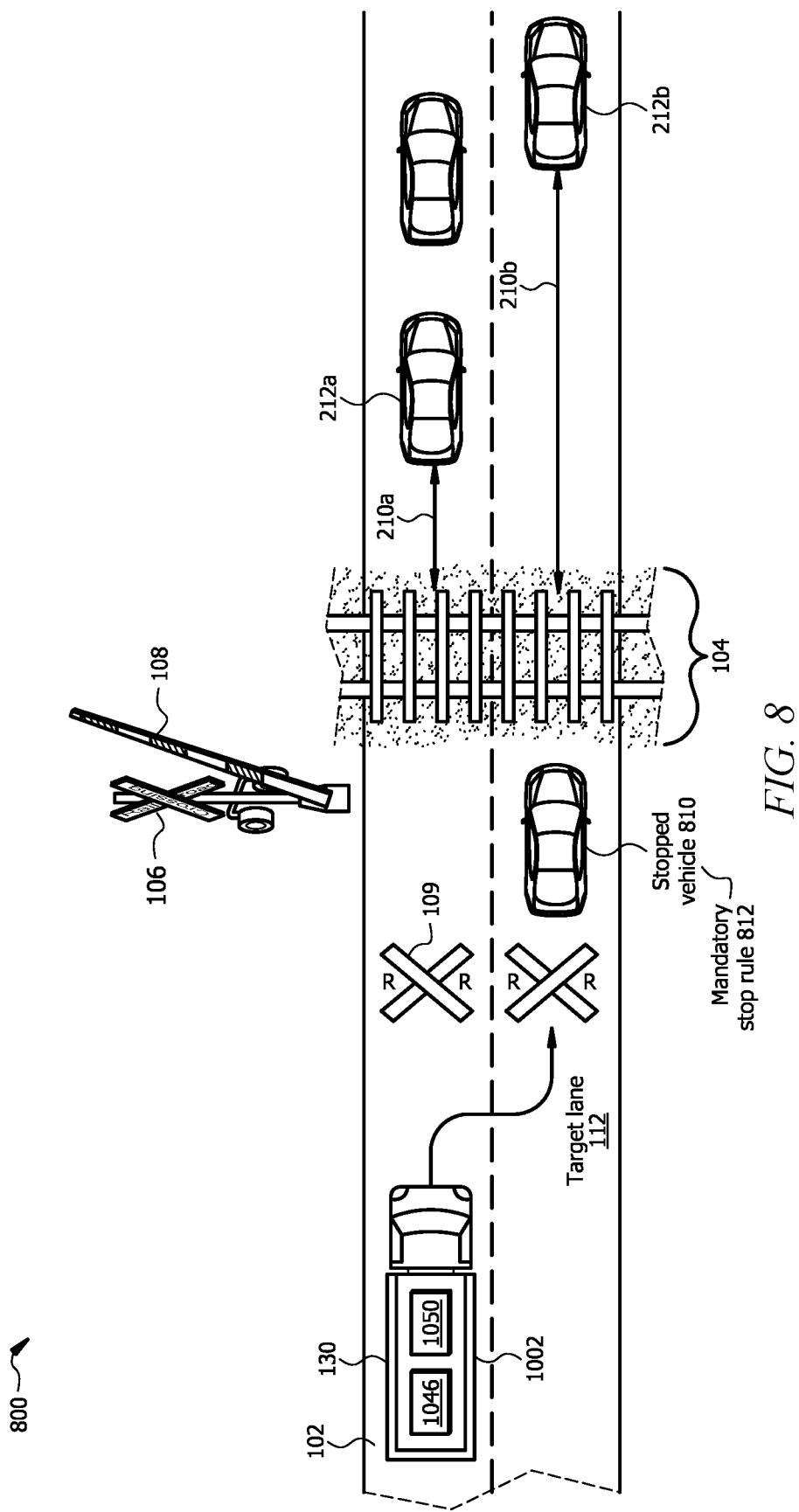
FIG. 8 illustrates an example operational flow of the system of FIG. 1 for autonomous vehicle navigation in response to detecting a stopped vehicle at a railroad crossing.

Operational Flow for Autonomous Vehicle Navigation in Response to Detecting a Stopped Vehicle at a Railroad Crossing FIG. 8 illustrates an example operational flow 800 of system 100 of FIG. 1 for navigation of an autonomous vehicle 1002 in response to detecting a stopped vehicle 810 at a railroad crossing 104. In an example scenario, assume that the autonomous vehicle 1002 is traveling along a road 102 where the railroad crossing 104 is located. The control device 1050 may detect the railroad crossing 104 by evaluating the sensor data 130, map data 134 (see FIG. 1), train schedule data, etc., similar to that described in FIG. 2. For example, the control device 1050 may implement the railroad crossing detection machine learning module 133, similar to that described in FIGS. 1 and 2.

Upon detecting that the autonomous vehicle 1002 is approaching the railroad crossing 104, the control device 1050 may determine whether the railroad crossing 104 is active or inactive, similar to that described in FIGS. 1 and 2, e.g., by implementing the railroad crossing detection machine learning module 133. In response to determining that the railroad crossing 104 is active, the control device 1050 may determine a target lane 112 for traveling while crossing the railroad, similar to that described in FIG. 2. For example, the control device 1050 may determine the target lane 112 by evaluating available distances 210a-b between each vehicle 212a-b and the railroad crossing 104 on each lane on the other side of the railroad, similar to that described in FIG. 2.

In response to determining the target lane 112, the control device 1050 may instruct the autonomous vehicle 1002 to travel on the target lane 112. For example, if the autonomous vehicle 1002 is not already on the target lane 112 (such as the example shown in FIG. 8), the control device 1050 may instruct the autonomous vehicle 1002 to change to the target lane 112. In the example of FIG. 8, it is assumed that the target lane 112 is the lane that the stopped vehicle 810 is on. The control device 1050 may also instruct the autonomous vehicle 1002 to slow down according to the traffic.

In the example of FIG. 8, it is assumed that no train is approaching the railroad crossing 104. Thus, the control device 1050 may determine that no train is approaching the railroad crossing 104, similar to that described in FIG. 2. For example, the control device 1050 may determine that no train is approaching the railroad crossing 104 if it determines that the sensor data 130 indicates that crossing arms 108 are positioned vertically. Similarly, the control device 1050 may implement the detection methods described in FIG. 2 to determine whether a train is approaching the railroad crossing 104, and in response to determining that more than a threshold number (e.g., 9 out of 10) of detection methods indicate that no train is approaching the railroad crossing 104, it may determine that no train is approaching the railroad crossing 104.

Detecting a Stopped Vehicle at the Railroad Crossing

The control device 1050 may detect the stopped vehicle 810 by analyzing the sensor data 130. For example, if the control device 1050 determines that the sensor data 130 includes indications of the stopped vehicle 810, such as at least one image or video showing at least a portion of the stopped vehicle 810 (e.g., where hazardous rear lights of the stopped vehicle 810 are turned on), the control device 1050 may detect that vehicle 810 is stopped. In another example, the control device 1050 may determine that the vehicle 610 is stopped based on determining an estimated speed of the vehicle 810 and determining that the estimated speed of the vehicle 810 is zero or less than a threshold speed (e.g., less than 0.1 miles per second). The control device 1050 may implement the object detection machine learning module 132 to detect the stopped vehicle 810.

The control device 1050 determines whether the stopped vehicle 810 is associated with a mandatory stop rule 812. The mandatory stop rule 812 indicates that vehicles carrying hazardous materials have to stop for a certain period at the railroad crossing even when no train is traveling through or approaching the railroad crossing, and the crossing arms 108, the signal lights, and other indicators of the railroad crossing indicate or direct the traffic to cross the railroad crossing. The mandatory stop rule 812 may be a part of a road safety regulation guideline.

In certain embodiments, determining whether the stopped vehicle 810 is associated with the mandatory stop rule 812 may include waiting for a threshold period 814 and determining whether the stopped vehicle 810 moves (e.g., forward, backward, changes lanes, etc.) by the threshold period 814. The threshold period 814 may be two minutes, five minutes, ten minutes, or any other suitable duration. If the stopped vehicle 810 moves by the threshold period 814, the control device 1050 determines that the stopped vehicle 810 is associated with the mandatory stop rule 812. Otherwise, the control device 1050 determines that the stopped vehicle is not associate with the mandatory stop rule 812.

If it is determined that the stopped vehicle 810 is associated with the mandatory stop rule 812, the control device 1050 may determine that the stopped vehicle 810 is carrying hazardous materials and it is not safe to pass the stopped vehicle 810. Therefore, if it is determined that the stopped vehicle 810 is associated with the mandatory stop rule 812, the control device 1050 may not pass by the stopped vehicle 810 by diverting to another lane. In this case, the control device 1050 may wait behind the stopped vehicle 810 until the stopped vehicle 810 crosses the railroad crossing 104. The control device 1050 may then instruct the autonomous vehicle 1002 to cross the railroad crossing 104.

On the other hand, if it is determined that the stopped vehicle 810 is not associated with the mandatory stop rule 812, the control device 1050 may determine that the stopped vehicle 810 may be broken down. In other words, if it is determined that the stopped vehicle 810 does not move or is not moving (e.g., forward, backward, changes lanes, etc.) by the threshold period 814, the control device 1050 may determine that the stopped vehicle 810 may be broken down and is in need of service. In this case, the control device 1050 may determine that it is safe to pass the stopped vehicle 810. In response, the control device 1050 may identify another target lane 112 similar to that described in FIG. 2.

The control device 1050 may then instruct the autonomous vehicle 1002 to change to the other target lane 112 before crossing the railroad crossing 104.

In certain embodiments, the control device 1050 may determine that the stopped vehicle 810 is associated with the mandatory stop rule 812 before determining the target lane 112. Therefore, in certain embodiments, if it is determined that the stopped vehicle 610 is associated with the mandatory stop rule 812, the control device 1050 may take the lane occupied by the stopped vehicle 810 out of consideration for determining the target lane 112.

In certain embodiments, after passing the stopped vehicle 810 (that is determined to be broken down), the autonomous vehicle 1002 may be instructed to change back to the initial target lane 112 before or after crossing the railroad crossing 104.

Navigating Across the Railroad Crossing

The control device 1050 may determine whether the target lane 112 provides available distance with at least the length of the autonomous vehicle 1002 on the other side of the railroad. In this process, the control device 1050 may re-evaluate the target lane 112 similar to that described in FIG. 2. For example, the control device 1050 may determine the target lane 112 by evaluating available distances 210a-b between each vehicle 212a-b and the railroad crossing 104 on each lane on the other side of the railroad, similar to that described in FIG. 2. If it is determined that the target lane 112 still provides available distance with at least the length of the autonomous vehicle 1002 on the other side of the railroad, the control device 1050 instructs the autonomous vehicle 1002 to cross the railroad. If it is determined that the target lane 112 no longer provides available distance with at least the length of the autonomous vehicle 1002 on the other side of the railroad crossing 104, the control device 1050 may instruct the autonomous vehicle 1002 to stop before entering the railroad crossing 104, wait until the target lane 112 provides available distance with at least the length of the autonomous vehicle 1002 on the other side of the railroad crossing 104, and then instruct the autonomous vehicle 1002 to cross the railroad.

In certain embodiments, the control device 1050 may inform the oversight server 140 (see FIG. 1) and/or following autonomous vehicles 1002 (within a communication range from the autonomous vehicle 1002) and/or law enforcement about the stopped vehicle 810 in the case that the stopped vehicle 610 is broken down, e.g., by communicating a message, similar to that described in FIG. 6.

In response to receiving the message, the following autonomous vehicles 1002 may plan ahead accordingly and take the lane occupied by the stopped vehicle 810 out of consideration for determining their respective target lanes 112. In response to receiving the message, the oversight server (see FIG. 1) may update the map data 134 (see FIG. 1) to include the stopped vehicle 810 at the railroad crossing 104 and communicate the updated map data 134 (see FIG. 1) to other autonomous vehicles 1002. In certain embodiments, the autonomous vehicle 1002 may update the map data 134 (see FIG. 1) and communicate to the following autonomous vehicles 1002. When the stopped vehicle 810 no longer occupies the lane (as detected by an autonomous vehicle 1002), the map data 134 (see FIG. 1) may be updated again to reflect the change and distributed among the autonomous vehicles 1002 by the autonomous vehicle 1002 and/or the oversight server 140 (see FIG. 1).

Figure 9:
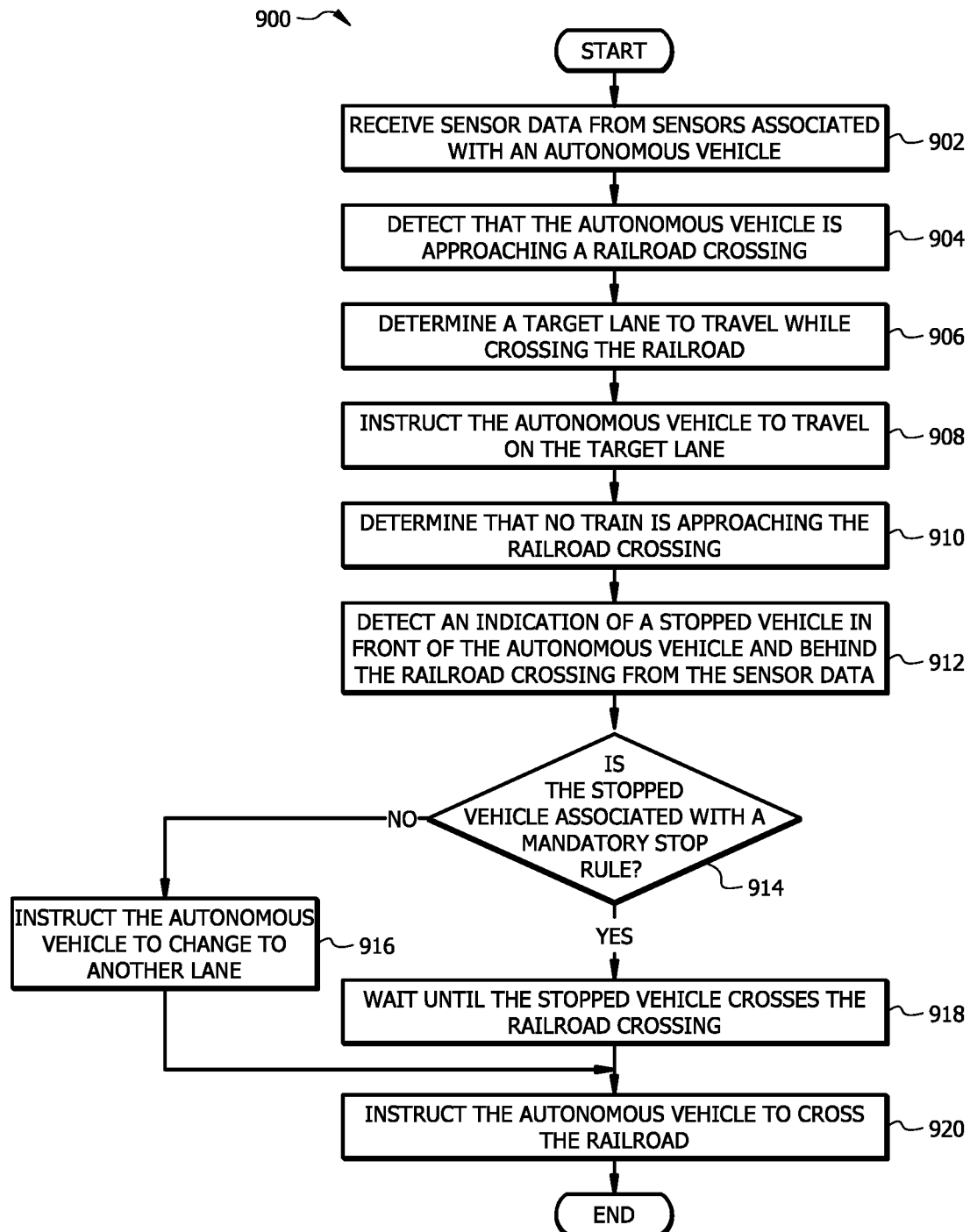
FIG. 9 illustrates an example flowchart of a method for autonomous vehicle navigation in response to detecting a stopped vehicle at a railroad crossing.

Example Method for Autonomous Vehicle Navigation in Response to a Stopped Vehicle at a Railroad Crossing FIG. 9 illustrates an example flowchart of a method 900 for autonomous vehicle navigation in response to a stopped vehicle at a railroad crossing. Modifications, additions, or omissions may be made to method 900. Method 900 may include more, fewer, or other operations. For example, operations may be performed in parallel or in any suitable order. While at times discussed as the system 100, autonomous vehicle 1002, control device 1050, or components of any of thereof performing operations, any suitable system or components of the system may perform one or more operations of the method 900. For example, one or more operations of method 900 may be implemented, at least in part, in the form of software instructions 128 and processing instructions 1080, respectively, from FIGS. 1 and 10, stored on non-transitory, tangible, machine-readable media (e.g., memory 126 and data storage 1090, respectively, from FIGS. 1 and 10) that when run by one or more processors (e.g., processors 122 and 1070, respectively, from FIGS. 1 and 10) may cause the one or more processors to perform operations 902-920.

At operation 902, the control device 1050 receives sensor data 130 from sensors 1046 associated with the autonomous vehicle 1002. For example, the control device 1050 may receive the sensor data 130 continuously, periodically (e.g., every second, every millisecond, etc.) or on demand.

At operation 904, the control device 1050 detects that the autonomous vehicle 1002 is approaching a railroad crossing 104. In this process, the control device 1050 may feed the sensor data 130 to the railroad crossing detection machine learning module 133 to determine whether the sensor data 130 includes any indication of a railroad crossing. Example detection railroad crossing methods are described in FIG. 2.

At operation 906, the control device 1050 determines a target lane 112 to travel while crossing the railroad. For example, the control device 1050 may determine the target lane 112 by evaluating available distances that traffic allows on each lane on the other side of the railroad, similar to that described in FIG. 2.

At operation 908, the control device 1050 instructs the autonomous vehicle 1002 to travel on the target lane 112. For example, the control device 1050 may implement vehicle subsystems 1040 (see FIG. 10) to instruct the autonomous vehicle to travel on the target lane 112. At operation 910, the control device 1050 determines that no train is approaching the railroad crossing 104.

At operation 912, the control device 1050 detects an indication of a stopped vehicle 810 in front of the autonomous vehicle 1002 and at the railroad crossing 104 from the sensor data 130. For example, the control device 1050 may implement the object detection machine learning module 132 to detect the stopped vehicle 610.

At operation 914, the control device 1050 determines whether the stopped vehicle 610 is associated with a mandatory stop rule 812. In certain embodiments, determining whether the stopped vehicle 610 is associated with the mandatory stop rule 812 may include waiting for a threshold period 814 and determining whether the stopped vehicle 810 moves (e.g., forward, backward, changes lanes, etc.) by the threshold period 814, similar to that described in FIG. 8. If it is determined that the stopped vehicle 810 is associated with the mandatory stop rule 812, method 900 proceeds to operation 918. Otherwise, method 900 proceeds to operation 916.

At operation 916, the control device 1050 instructs the autonomous vehicle 1002 to change to another lane. In other words, the control device 1050 may instruct the autonomous vehicle 1002 to pass or by-pass the stopped vehicle 810. At operation 918, the control device 1050 waits until the stopped vehicle 810 crosses the railroad crossing 104.

At operation 920, the control device 1050 receives sensor data 130 from sensors 1046 associated with the autonomous vehicle 1002. In certain embodiments, the control device 1050 may also determine whether the target lane 112 still provides available distance with at least the length of the autonomous vehicle 1002 on the other side of the railroad after the stopped vehicle 810 crosses the railroad crossing 104. In this process, the control device 1050 may re-evaluate the target lane 112 similar to that described in FIG. 2. If it is determined that the target lane 112 still provides available distance with at least the length of the autonomous vehicle 1002 on the other side of the railroad, the control device 1050 instructs the autonomous vehicle 1002 to cross the railroad. If it is determined that the target lane 112 no longer provides available distance with at least the length of the autonomous vehicle 1002 on the other side of the railroad crossing 104, the control device 1050 may instruct the autonomous vehicle 1002 to stop before entering the railroad crossing 104, wait until the target lane 112 provides available distance with at least the length of the autonomous vehicle 1002 on the other side of the railroad crossing 104, and then instruct the autonomous vehicle 1002 to cross the railroad.

Example Autonomous Vehicle and its Operation

FIG. 10 shows a block diagram of an example vehicle ecosystem 1000 in which autonomous driving operations can be determined. As shown in FIG. 10, the autonomous vehicle 1002 may be a semi-trailer truck. The vehicle ecosystem 1000 may include several systems and components that can generate and/or deliver one or more sources of information/data and related services to the in-vehicle control computer 1050 that may be located in an autonomous vehicle 1002. The in-vehicle control computer 1050 can be in data communication with a plurality of vehicle subsystems 1040, all of which can be resident in the autonomous vehicle 1002. A vehicle subsystem interface 1060 may be provided to facilitate data communication between the in-vehicle control computer 1050 and the plurality of vehicle subsystems 1040. In some embodiments, the vehicle subsystem interface 1060 can include a controller area network (CAN) controller to communicate with devices in the vehicle subsystems 1040.

The autonomous vehicle 1002 may include various vehicle subsystems that support the operation of the autonomous vehicle 1002. The vehicle subsystems 1040 may include a vehicle drive subsystem 1042, a vehicle sensor subsystem 1044, a vehicle control subsystem 1048, and/or network communication subsystem 1092. The components or devices of the vehicle drive subsystem 1042, the vehicle sensor subsystem 1044, and the vehicle control subsystem 1048 shown in FIG. 10 are examples. The autonomous vehicle 1002 may be configured as shown or any other configurations.

The vehicle drive subsystem 1042 may include components operable to provide powered motion for the autonomous vehicle 1002. In an example embodiment, the vehicle drive subsystem 1042 may include an engine/motor 1042a, wheels/tires 1042b, a transmission 1042c, an electrical subsystem 1042d, and a power source 1042e.

The vehicle sensor subsystem 1044 may include a number of sensors 1046 configured to sense information about an environment or condition of the autonomous vehicle 1002. The vehicle sensor subsystem 1044 may include one or more cameras 1046a or image capture devices, a radar unit 1046b, one or more thermal sensors 1046c, a wireless communication unit 1046d (e.g., a cellular communication transceiver), an inertial measurement unit (IMU) 1046e, a laser range finder/LiDAR unit 1046f, a Global Positioning System (GPS) transceiver 1046g, a wiper control system 1046h. The vehicle sensor subsystem 1044 may also include sensors configured to monitor internal systems of the autonomous vehicle 1002 (e.g., an O2 monitor, a fuel gauge, an engine oil temperature, etc.).

The IMU 1046e may include any combination of sensors (e.g., accelerometers and gyroscopes) configured to sense position and orientation changes of the autonomous vehicle 1002 based on inertial acceleration. The GPS transceiver 1046g may be any sensor configured to estimate a geographic location of the autonomous vehicle 1002. For this purpose, the GPS transceiver 1046g may include a receiver/transmitter operable to provide information regarding the position of the autonomous vehicle 1002 with respect to the Earth. The radar unit 1046b may represent a system that utilizes radio signals to sense objects within the local environment of the autonomous vehicle 1002. In some embodiments, in addition to sensing the objects, the radar unit 1046b may additionally be configured to sense the speed and the heading of the objects proximate to the autonomous vehicle 1002. The laser range finder or LiDAR unit 1046f may be any sensor configured to use lasers to sense objects in the environment in which the autonomous vehicle 1002 is located. The cameras 1046a may include one or more devices configured to capture a plurality of images of the environment of the autonomous vehicle 1002. The cameras 1046a may be still image cameras or motion video cameras.

Cameras 1046a may be rear-facing and front-facing so that pedestrians, and any hand signals made by them or signs held by pedestrians, may be observed from all around the autonomous vehicle. These cameras 1046a may include video cameras, cameras with filters for specific wavelengths, as well as any other cameras suitable to detect hand signals, hand-held traffic signs, or both hand signals and hand-held traffic signs. A sound detection array, such as a microphone or array of microphones, may be included in the vehicle sensor subsystem 1044. The microphones of the sound detection array may be configured to receive audio indications of the presence of, or instructions from, authorities, including sirens and commands such as "Pull over." These microphones are mounted, or located, on the external portion of the vehicle, specifically on the outside of the tractor portion of an autonomous vehicle. Microphones used may be any suitable type, mounted such that they are effective both when the autonomous vehicle is at rest, as well as when it is moving at normal driving speeds.

The vehicle control subsystem 1048 may be configured to control the operation of the autonomous vehicle 1002 and its components. Accordingly, the vehicle control subsystem 1048 may include various elements such as a throttle and gear selector 1048a, a brake unit 1048b, a navigation unit 1048c, a steering system 1048d, and/or an autonomous control unit 1048e. The throttle and gear selector 1048a may be configured to control, for instance, the operating speed of the engine and, in turn, control the speed of the autonomous vehicle 1002. The throttle and gear selector 1048a may be configured to control the gear selection of the transmission. The brake unit 1048b can include any combination of mechanisms configured to decelerate the autonomous vehicle 1002. The brake unit 1048b can slow the autonomous vehicle 1002 in a standard manner, including by using friction to slow the wheels or engine braking. The brake unit 1048b may include an anti-lock brake system (ABS) that can prevent the brakes from locking up when the brakes are applied. The navigation unit 1048c may be any system configured to determine a driving path or route for the autonomous vehicle 1002. The navigation unit 1048c may additionally be configured to update the driving path dynamically while the autonomous vehicle 1002 is in operation. In some embodiments, the navigation unit 1048c may be configured to incorporate data from the GPS transceiver 1046g and one or more predetermined maps so as to determine the driving path for the autonomous vehicle 1002. The steering system 1048d may represent any combination of mechanisms that may be operable to adjust the heading of autonomous vehicle 1002 in an autonomous mode or in a driver-controlled mode.

The autonomous control unit 1048e may represent a control system configured to identify, evaluate, and avoid or otherwise negotiate potential obstacles or obstructions in the environment of the autonomous vehicle 1002. In general, the autonomous control unit 1048e may be configured to control the autonomous vehicle 1002 for operation without a driver or to provide driver assistance in controlling the autonomous vehicle 1002. In some embodiments, the autonomous control unit 1048e may be configured to incorporate data from the GPS transceiver 1046g, the radar unit 1046b, the LiDAR unit 1046f, the cameras 1046a, and/or other vehicle subsystems to determine the driving path or trajectory for the autonomous vehicle 1002.

The network communication subsystem 1092 may comprise network interfaces, such as routers, switches, modems, and/or the like. The network communication subsystem 1092 may be configured to establish communication between the autonomous vehicle 1002 and other systems, servers, etc. The network communication subsystem 1092 may be further configured to send and receive data from and to other systems.

Many or all of the functions of the autonomous vehicle 1002 can be controlled by the in-vehicle control computer 1050. The in-vehicle control computer 1050 may include at least one data processor 1070 (which can include at least one microprocessor) that executes processing instructions 1080 stored in a non-transitory computer-readable medium, such as the data storage device 1090 or memory. The in-vehicle control computer 1050 may also represent a plurality of computing devices that may serve to control individual components or subsystems of the autonomous vehicle 1002 in a distributed fashion. In some embodiments, the data storage device 1090 may contain processing instructions 1080 (e.g., program logic) executable by the data processor 1070 to perform various methods and/or functions of the autonomous vehicle 1002, including those described with respect to FIGS. 1-12.

The data storage device 1090 may contain additional instructions as well, including instructions to transmit data to, receive data from, interact with, or control one or more of the vehicle drive subsystem 1042, the vehicle sensor subsystem 1044, and the vehicle control subsystem 1048. The in-vehicle control computer 1050 can be configured to include a data processor 1070 and a data storage device 1090. The in-vehicle control computer 1050 may control the function of the autonomous vehicle 1002 based on inputs received from various vehicle subsystems (e.g., the vehicle drive subsystem 1042, the vehicle sensor subsystem 1044, and the vehicle control subsystem 1048).

FIG. 11 shows an exemplary system 1100 for providing precise autonomous driving operations. The system 1100 may include several modules that can operate in the in-vehicle control computer 1050, as described in FIG. 10. The in-vehicle control computer 1050 may include a sensor fusion module 1102 shown in the top left corner of FIG. 11, where the sensor fusion module 1102 may perform at least four image or signal processing operations. The sensor fusion module 1102 can obtain images from cameras located on an autonomous vehicle to perform image segmentation 1104 to detect the presence of moving objects (e.g., other vehicles, pedestrians, etc.,) and/or static obstacles (e.g., stop sign, speed bump, terrain, etc.,) located around the autonomous vehicle. The sensor fusion module 1102 can obtain LiDAR point cloud data item from LiDAR sensors located on the autonomous vehicle to perform LiDAR segmentation 1106 to detect the presence of objects and/or obstacles located around the autonomous vehicle.

The sensor fusion module 1102 can perform instance segmentation 1108 on image and/or point cloud data items to identify an outline (e.g., boxes) around the objects and/or obstacles located around the autonomous vehicle. The sensor fusion module 1102 can perform temporal fusion 1110 where objects and/or obstacles from one image and/or one frame of point cloud data item are correlated with or associated with objects and/or obstacles from one or more images or frames subsequently received in time.

The sensor fusion module 1102 can fuse the objects and/or obstacles from the images obtained from the camera and/or point cloud data item obtained from the LiDAR sensors. For example, the sensor fusion module 1102 may determine based on a location of two cameras that an image from one of the cameras comprising one half of a vehicle located in front of the autonomous vehicle is the same as the vehicle captured by another camera. The sensor fusion module 1102 may send the fused object information to the tracking or prediction module 1146 and the fused obstacle information to the occupancy grid module 1160. The in-vehicle control computer may include the occupancy grid module 1160 which can retrieve landmarks from a map database 1158 stored in the in-vehicle control computer. The occupancy grid module 1160 can determine drivable areas and/or obstacles from the fused obstacles obtained from the sensor fusion module 1102 and the landmarks stored in the map database 1158. For example, the occupancy grid module 1160 can determine that a drivable area may include a speed bump obstacle.

As shown in FIG. 11 below the sensor fusion module 1102, the in-vehicle control computer 1050 may include a LiDAR-based object detection module 1112 that can perform object detection 1116 based on point cloud data item obtained from the LiDAR sensors 1114 located on the autonomous vehicle. The object detection 1116 technique can provide a location (e.g., in 3D world coordinates) of objects from the point cloud data item. Below the liDAR-based object detection module 1112, the in-vehicle control computer may include an image-based object detection module 1118 that can perform object detection 1124 based on images obtained from cameras 1120 located on the autonomous vehicle. For example, the object detection 1118 technique can employ a deep image-based object detection 1124 (e.g., a machine learning technique) to provide a location (e.g., in 3D world coordinates) of objects from the image provided by the camera 1120.

The radar 1156 on the autonomous vehicle can scan an area surrounding the autonomous vehicle or an area towards which the autonomous vehicle is driven. The radar data may be sent to the sensor fusion module 1102 that can use the radar data to correlate the objects and/or obstacles detected by the radar 1156 with the objects and/or obstacles detected from both the LiDAR point cloud data item and the camera image. The radar data also may be sent to the tracking or prediction module 1146 that can perform data processing on the radar data to track objects by object tracking module 1148 as further described below.

The in-vehicle control computer may include a tracking or prediction module 1146 that receives the locations of the objects from the point cloud and the objects from the image, and the fused objects from the sensor fusion module 1102. The tracking or prediction module 1146 also receives the radar data with which the tracking or prediction module 1146 can track objects by object tracking module 1148 from one point cloud data item and one image obtained at one time instance to another (or the next) point cloud data item and another image obtained at another subsequent time instance.

The tracking or prediction module 1146 may perform object attribute estimation 1150 to estimate one or more attributes of an object detected in an image or point cloud data item. The one or more attributes of the object may include a type of object (e.g., pedestrian, car, or truck, etc.). The tracking or prediction module 1146 may perform behavior prediction 1152 to estimate or predict the motion pattern of an object detected in an image and/or a point cloud. The behavior prediction 1152 can be performed to detect a location of an object in a set of images received at different points in time (e.g., sequential images) or in a set of point cloud data items received at different points in time (e.g., sequential point cloud data items). In some embodiments, the behavior prediction 1152 can be performed for each image received from a camera and/or each point cloud data item received from the LiDAR sensor. In some embodiments, the tracking or prediction module 1146 can be performed (e.g., run or executed) on received data to reduce computational load by performing behavior prediction 1152 on every other or after every pre-determined number of images received from a camera or point cloud data item received from the LiDAR sensor (e.g., after every two images or after every three-point cloud data items).

The behavior prediction 1152 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking or prediction module 1146 may assign motion pattern situational tags to the objects (e.g., "located at coordinates (x,y)," "stopped," "driving at 50 mph," "speeding up" or "slowing down"). The situation tags can describe the motion pattern of the object. The tracking or prediction module 1146 may send the one or more object attributes (e.g., types of the objects) and motion pattern situational tags to the planning module 1162. The tracking or prediction module 1146 may perform an environment analysis 1154 using any information acquired by system 1100 and any number and combination of its components.

The in-vehicle control computer may include the planning module 1162 that receives the object attributes and motion pattern situational tags from the tracking or prediction module 1146, the drivable area and/or obstacles, and the vehicle location and pose information from the fused localization module 1126 (further described below).

The planning module 1162 can perform navigation planning 1164 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 1164 may include determining an area next to the road where the autonomous vehicle can be safely parked in a case of emergencies. The planning module 1162 may include behavioral decision making 1166 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 1162 performs trajectory generation 1168 and selects a trajectory from the set of trajectories determined by the navigation planning operation 1164. The selected trajectory information may be sent by the planning module 1162 to the control module 1170.

The in-vehicle control computer may include a control module 1170 that receives the proposed trajectory from the planning module 1162 and the autonomous vehicle location and pose from the fused localization module 1126. The control module 1170 may include a system identifier 1172. The control module 1170 can perform a model-based trajectory refinement 1174 to refine the proposed trajectory. For example, the control module 1170 can apply filtering (e.g., Kalman filter) to make the proposed trajectory data smooth and/or to minimize noise. The control module 1170 may perform the robust control 1176 by determining, based on the refined proposed trajectory information and current location and/or pose of the autonomous vehicle, an amount of brake pressure to apply, a steering angle, a throttle amount to control the speed of the vehicle, and/or a transmission gear. The control module 1170 can send the determined brake pressure, steering angle, throttle amount, and/or transmission gear to one or more devices in the autonomous vehicle to control and facilitate precise driving operations of the autonomous vehicle.

The deep image-based object detection 1124 performed by the image-based object detection module 1118 can also be used detect landmarks (e.g., stop signs, speed bumps, etc.,) on the road. The in-vehicle control computer may include a fused localization module 1126 that obtains landmarks detected from images, the landmarks obtained from a map database 1136 stored on the in-vehicle control computer, the landmarks detected from the point cloud data item by the LiDAR-based object detection module 1112, the speed and displacement from the odometer sensor 1144, or a rotary encoder, and the estimated location of the autonomous vehicle from the GPS/IMU sensor 1138 (i.e., GPS sensor 1140 and IMU sensor 1142) located on or in the autonomous vehicle. Based on this information, the fused localization module 1126 can perform a localization operation 1128 to determine a location of the autonomous vehicle, which can be sent to the planning module 1162 and the control module 1170.

The fused localization module 1126 can estimate pose 1130 of the autonomous vehicle based on the GPS and/or IMU sensors 1138. The pose of the autonomous vehicle can be sent to the planning module 1162 and the control module 1170. The fused localization module 1126 can also estimate status (e.g., location, possible angle of movement) of the trailer unit based on (e.g., trailer status estimation 1134), for example, the information provided by the IMU sensor 1142 (e.g., angular rate and/or linear velocity). The fused localization module 1126 may also check the map content 1132.

Figure 12:
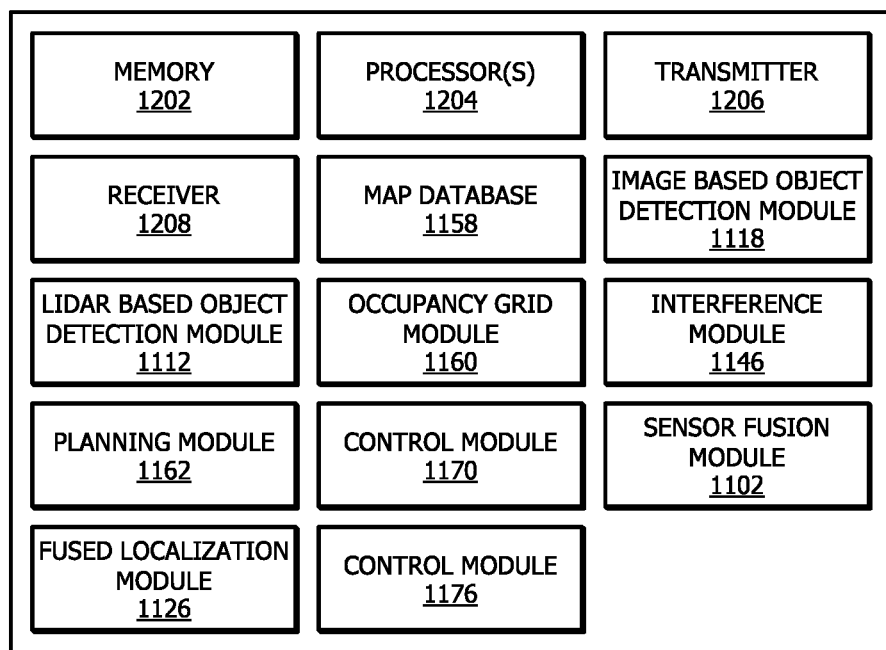
FIG. 12 illustrates a block diagram of an in-vehicle control computer included in the autonomous vehicle of FIG. 10.

FIG. 12 shows an exemplary block diagram of an in-vehicle control computer 1050 included in an autonomous vehicle 1002. The in-vehicle control computer 1050 may include at least one processor 1204 and a memory 1202 having instructions stored thereupon (e.g., software instructions 128 and processing instructions 1080 in FIGS. 1 and 10, respectively). The instructions, upon execution by the processor 1204, configure the in-vehicle control computer 1050 and/or the various modules of the in-vehicle control computer 1050 to perform the operations described in FIGS. 1-12. The transmitter 1206 may transmit or send information or data to one or more devices in the autonomous vehicle. For example, the transmitter 1206 can send an instruction to one or more motors of the steering wheel to steer the autonomous vehicle. The receiver 1208 receives information or data transmitted or sent by one or more devices. For example, the receiver 1208 receives a status of the current speed from the odometer sensor or the current transmission gear from the transmission. The transmitter 1206 and receiver 1208 also may be configured to communicate with the plurality of vehicle subsystems 1040 and the in-vehicle control computer 1050 described above in FIGS. 11 and 12.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system comprising:
a memory configured to store sensor data that provides information about an environment in front of an autonomous vehicle; and
a control device associated with the autonomous vehicle, the control device comprising a processor operably coupled to the memory, and configured to:
receive the sensor data from at least one sensor associated with the autonomous vehicle;
detect that the autonomous vehicle is approaching a railroad crossing based at least in part upon the sensor data;
determine a target lane to travel while crossing the railroad, wherein the target lane is a lane that has available space with at least a length of the autonomous vehicle on another side of the railroad as opposed to a side of the railroad where the autonomous vehicle is currently traveling;
instruct the autonomous vehicle to travel on the target lane;
determine that no train is approaching the railroad crossing from the sensor data, wherein determining that no train is approaching the railroad crossing comprises determining that crossing arms associated with the railroad are positioned vertically;
instruct the autonomous vehicle to travel toward the railroad;
determine whether the target lane still provides available space with at least the length of the autonomous vehicle on the other side of the railroad; and
in response to determining that the target lane still provides available space with at least the length of the autonomous vehicle on the other side of the railroad, instruct the autonomous vehicle to cross the railroad.

Clause 2. The system of Clause 1, wherein the processor is further configured to:
in response to determining that the target lane no longer provides available space with at least the length of the autonomous vehicle on the other side of the railroad:
instruct the autonomous vehicle to stop before entering the railroad crossing;
after waiting until the target lane provides available space with at least the length of the autonomous vehicle on the other side of the railroad, wait until the target lane provides available space with at least the length of the autonomous vehicle on the other side of the railroad; and instruct the autonomous vehicle to cross the railroad.

Clause 3. The system of Clause 1, wherein detecting that the autonomous vehicle is approaching the railroad crossing comprises determining that the sensor data comprises one or more indications of the railroad.

Clause 4. The system of Clause 3, wherein the one or more indications comprise a railroad crossing sign, the crossing arms, or a railroad traffic light.

Clause 5. The system of Clause 1, wherein detecting that the autonomous vehicle is approaching the railroad crossing comprises:
- accessing map data that comprises location coordinates of objects on a road traveled by the autonomous vehicle; and
- determining that the map data indicates the railroad crossing on the road.

Clause 6. The system of Clause 1, wherein determining the target lane comprises:
- receiving the sensor data that comprises indications of traffic on the other side of the railroad;
- determining, based at least in part upon the traffic on the other side of the railroad, available distance in each lane of a road on the other side of the railroad;
- comparing the determined available distance in each lane of the road on the other side of the railroad with the length of the autonomous vehicle; and
- determining that the target lane provides the available space with at least the length of the autonomous vehicle on the other side of the railroad.

Clause 7. The system of Clause 1, wherein determining the target lane comprises:
- accessing map data that comprises a particular route reaching a predetermined destination of the autonomous vehicle;
- comparing each route associated with each lane of a road on the other side of the railroad with the particular route; and
- selecting, based at least in part upon the comparison, the target lane that leads to the particular route toward the predetermined destination.

Clause 8. A method comprising:
- receiving sensor data from at least one sensor associated with an autonomous vehicle, wherein the sensor data that provides information about an environment in front of the autonomous vehicle;
- detecting that the autonomous vehicle is approaching a railroad crossing based at least in part upon the sensor data;
- determining a target lane to travel while crossing the railroad, wherein the target lane is a lane that has available space with at least a length of the autonomous vehicle on another side of the railroad as opposed to a side of the railroad where the autonomous vehicle is currently traveling;
- instructing the autonomous vehicle to travel on the target lane;
- determining that no train is approaching the railroad crossing from the sensor data, wherein determining that no train is approaching the railroad crossing comprises determining that crossing arms associated with the railroad are positioned vertically;
- instructing the autonomous vehicle to travel toward the railroad;
- determining whether the target lane still provides available space with at least the length of the autonomous vehicle on the other side of the railroad; and
- in response to determining that the target lane still provides available space with at least the length of the autonomous vehicle on the other side of the railroad, instructing the autonomous vehicle to cross the railroad.

Clause 9. The method of Clause 8, wherein determining that no train is approaching the railroad crossing from the sensor data further comprises determining that signal lights associated with the railroad are indicating that no train is approaching the railroad crossing.

Clause 10. The method of Clause 8, wherein determining that no train is approaching the railroad crossing from the sensor data further comprises determining one or more auditory cues that indicate no train is approaching the railroad crossing.

Clause 11. The method of Clause 10, wherein the one or more auditory cues comprise an absence of a train horn or an absence of a bell sound associated with an alarm sound-making component associated with the railroad.

Clause 12. The method of Clause 8, wherein determining that no train is approaching the railroad crossing from the sensor data further comprises determining that the sensor data does not comprise even one image showing at least a portion of a train.

Clause 13. The method of Clause 8, wherein determining that no train is approaching the railroad crossing from the sensor data further comprises determining that the sensor data does not comprise even one image showing a person directing traffic at the railroad crossing to cross the railroad.

Clause 14. The method of Clause 8, wherein the at least one sensor comprises at least one of a camera, a microphone, a light detection and ranging sensor, an infrared sensor, or a radar.

Clause 15. A non-transitory computer-readable medium storing instructions that when executed by one or more processors causes the one or more processors to:
- receive sensor data from at least one sensor associated with an autonomous vehicle, wherein the sensor data that provides information about an environment in front of the autonomous vehicle;
- detect that the autonomous vehicle is approaching a railroad crossing based at least in part upon the sensor data;
- determine a target lane to travel while crossing the railroad, wherein the target lane is a lane that has available space with at least a length of the autonomous vehicle on another side of the railroad as opposed to a side of the railroad where the autonomous vehicle is currently traveling;
- instruct the autonomous vehicle to travel on the target lane;
- determine that no train is approaching the railroad crossing from the sensor data, wherein determining that no train is approaching the railroad crossing comprises determining that crossing arms associated with the railroad are positioned vertically;
- instruct the autonomous vehicle to travel toward the railroad;
- determine whether the target lane still provides available space with at least the length of the autonomous vehicle on the other side of the railroad; and
- in response to determining that the target lane still provides available space with at least the length of the autonomous vehicle on the other side of the railroad, instruct the autonomous vehicle to cross the railroad.

Clause 16. The non-transitory computer-readable medium of Clause 15, wherein the instructions when executed by the one or more processors, further cause the one or more processors to:

before instructing the autonomous vehicle to cross the railroad:
instruct the autonomous vehicle to slow down to a particular speed; and
instruct the autonomous vehicle to change a gear of the autonomous vehicle to a desired gear such that the one or more processors do not have to change from the desired gear to another gear while crossing the railroad.

Clause 17. The non-transitory computer-readable medium of Clause 16, wherein the desired gear is determined based at least in part upon one or more of:
terrain around the railroad crossing;
weather conditions in an area surrounding the railroad crossing;
road conditions on a traveling path of the autonomous vehicle toward the railroad crossing;
the particular speed; or
traffic at the railroad crossing.

Clause 18. The non-transitory computer-readable medium of Clause 16, wherein the particular speed is determined based at least in part upon one or more of:
terrain around the railroad crossing;
weather conditions in an area surrounding the railroad crossing;
road conditions on a traveling path of the autonomous vehicle toward the railroad crossing; or
traffic at the railroad crossing.

Clause 19. The non-transitory computer-readable medium of Clause 15, wherein the sensor data comprises at least one of an image feed, a video feed, an audio feed, a light detection and ranging data feed, an infrared image feed, or a radar data feed.

Clause 20. The non-transitory computer-readable medium of Clause 15, wherein the autonomous vehicle is a semi-truck tractor unit attached to a trailer.

Clause 21. A system comprising:
a memory configured to store sensor data that provides information about an environment in front of an autonomous vehicle; and
a control device associated with the autonomous vehicle, the control device comprising a processor operably coupled to the memory, and configured to:
receive the sensor data from at least one sensor associated with the autonomous vehicle;
detect that the autonomous vehicle is approaching a railroad crossing based at least in part upon the sensor data;
determine a target lane to travel while crossing the railroad, wherein the target lane is a lane that has available space with at least a length of the autonomous vehicle on another side of the railroad as opposed to a side of the railroad where the autonomous vehicle is currently traveling;
instruct the autonomous vehicle to travel on the target lane;
determine that a train is approaching the railroad crossing from the sensor data, wherein determining that the train is approaching the railroad crossing comprises determining that crossing arms associated with the railroad are coming down or already at horizontal position;
instruct the autonomous vehicle to travel toward the railroad and stop within a threshold distance window from the railroad;
wait for the train to pass the railroad crossing;
determine that the train has passed the railroad crossing, wherein determining that the train has passed the railroad crossing comprises detecting that the sensor data comprises indicators indicating that the crossing arms have moved up to vertical position;
determine whether the target lane still provides available space with at least the length of the autonomous vehicle on the other side of the railroad; and
in response to determining that the target lane still provides available space with at least the length of the autonomous vehicle on the other side of the railroad, instruct the autonomous vehicle to cross the railroad.

Clause 22. The system of Clause 21, wherein the processor is further configured to:
in response to determining that the target lane no longer provides available space with at least the length of the autonomous vehicle on the other side of the railroad:
instruct the autonomous vehicle to stop before entering the railroad crossing;
after waiting until the target lane provides available space with at least the length of the autonomous vehicle on the other side of the railroad, wait until the target lane provides available space with at least the length of the autonomous vehicle on the other side of the railroad; and
instruct the autonomous vehicle to cross the railroad.

Clause 23. The system of Clause 21, wherein detecting that the autonomous vehicle is approaching the railroad crossing comprises determining that the sensor data comprises one or more indications of the railroad.

Clause 24. The system of Clause 23, wherein the one or more indications comprise a railroad crossing sign, the crossing arms, or a railroad traffic light.

Clause 25. The system of Clause 21, wherein detecting that the autonomous vehicle is approaching the railroad crossing comprises:
accessing map data that comprises location coordinates of objects on a road traveled by the autonomous vehicle; and
determining that the map data indicates the railroad crossing on the road.

Clause 26. The system of Clause 21, wherein determining the target lane comprises:
receiving the sensor data that comprises indications of traffic on the other side of the railroad;
determining, based at least in part upon the traffic on the other side of the railroad, available distance in each lane of a road on the other side of the railroad;
comparing the determined available distance in each lane of the road on the other side of the railroad with the length of the autonomous vehicle; and
determining that the target lane provides the available space with at least the length of the autonomous vehicle on the other side of the railroad.

Clause 27. The system of Clause 21, wherein determining the target lane comprises:
accessing map data that comprises a particular route reaching a predetermined destination of the autonomous vehicle;
comparing each route associated with each lane of a road on the other side of the railroad with the particular route; and selecting, based at least in part upon the comparison, the target lane that leads to the particular route toward the predetermined destination.

Clause 28. A method comprising:
receiving sensor data from at least one sensor associated with an autonomous vehicle, wherein the sensor data that provides information about an environment in front of the autonomous vehicle;
detecting that the autonomous vehicle is approaching a railroad crossing based at least in part upon the sensor data;
determining a target lane to travel while crossing the railroad, wherein the target lane is a lane that has available space with at least a length of the autonomous vehicle on another side of the railroad as opposed to a side of the railroad where the autonomous vehicle is currently traveling;
instructing the autonomous vehicle to travel on the target lane;
determining that a train is approaching the railroad crossing from the sensor data, wherein determining that the train is approaching the railroad crossing comprises determining that crossing arms associated with the railroad are coming down or already at horizontal position;
instructing the autonomous vehicle to travel toward the railroad and stop within a threshold distance window from the railroad;
waiting for the train to pass the railroad crossing;
determining that the train has passed the railroad crossing, wherein determining that the train has passed the railroad crossing comprises detecting that the sensor data comprises indicators indicating that the crossing arms have moved up to vertical position;
determining whether the target lane still provides available space with at least the length of the autonomous vehicle on the other side of the railroad; and
in response to determining that the target lane still provides available space with at least the length of the autonomous vehicle on the other side of the railroad, instructing the autonomous vehicle to cross the railroad.

Clause 29. The method of Clause 28, wherein determining that the train is approaching the railroad crossing from the sensor data further comprises determining that signal lights associated with the railroad are indicating that the train is approaching the railroad crossing.

Clause 30. The method of Clause 28, wherein determining that the train is approaching the railroad crossing from the sensor data further comprises determining one or more auditory cues that indicate the train is approaching the railroad crossing.

Clause 31. The method of Clause 30, wherein the one or more auditory cues comprise a train horn sound or a bell sound associated with an alarm sound-making component associated with the railroad.

Clause 32. The method of Clause 28, wherein determining that the train is approaching the railroad crossing from the sensor data further comprises determining that the sensor data comprises at least one image showing at least a portion of a train.

Clause 33. The method of Clause 28, wherein determining that the train is approaching the railroad crossing from the sensor data further comprises determining that the sensor data comprises at least one image showing a person directing traffic at the railroad crossing to stop behind the railroad.

Clause 34. The method of Clause 28, wherein the autonomous vehicle is a semi-truck tractor unit attached to a trailer.

Clause 35. A non-transitory computer-readable medium storing instructions that when executed by one or more processors causes the one or more processors to:
receive sensor data from at least one sensor associated with an autonomous vehicle, wherein the sensor data that provides information about an environment in front of the autonomous vehicle;
detect that the autonomous vehicle is approaching a railroad crossing based at least in part upon the sensor data;
determine a target lane to travel while crossing the railroad, wherein the target lane is a lane that has available space with at least a length of the autonomous vehicle on another side of the railroad as opposed to a side of the railroad where the autonomous vehicle is currently traveling;
instruct the autonomous vehicle to travel on the target lane;
determine that a train is approaching the railroad crossing from the sensor data, wherein determining that the train is approaching the railroad crossing comprises determining that crossing arms associated with the railroad are coming down or already at horizontal position;
instruct the autonomous vehicle to travel toward the railroad and stop within a threshold distance window from the railroad;
wait for the train to pass the railroad crossing;
determine that the train has passed the railroad crossing, wherein determining that the train has passed the railroad crossing comprises detecting that the sensor data comprises indicators indicating that the crossing arms have moved up to vertical position;
determine whether the target lane still provides available space with at least the length of the autonomous vehicle on the other side of the railroad; and
in response to determining that the target lane still provides available space with at least the length of the autonomous vehicle on the other side of the railroad, instruct the autonomous vehicle to cross the railroad.

Clause 36. The non-transitory computer-readable medium of Clause 35, wherein the instructions when executed by the one or more processors, further cause the one or more processors to
before instructing the autonomous vehicle to cross the railroad:
instructing the autonomous vehicle to slow down to a particular speed; and
instructing the autonomous vehicle to change a gear of the autonomous vehicle to a desired gear such that the one or more processors do not have to change from the desired gear to another gear while crossing the railroad.

Clause 37. The non-transitory computer-readable medium of Clause 36, wherein the desired gear is determined based at least in part upon one or more of:
terrain around the railroad crossing;
weather conditions in an area surrounding the railroad crossing;
road conditions on a traveling path of the autonomous vehicle toward the railroad crossing;
the particular speed; or
traffic at the railroad crossing.

Clause 38. The non-transitory computer-readable medium of Clause 36, wherein the particular speed is determined based at least in part upon one or more of:

terrain around the railroad crossing;
weather conditions in an area surrounding the railroad crossing;
road conditions on a traveling path of the autonomous vehicle toward the railroad crossing; or
traffic at the railroad crossing.

Clause 39. The non-transitory computer-readable medium of Clause 35, wherein determining that the train has passed the railroad crossing further comprises determining that the sensor data comprises one or more auditory cues that indicate the train has passed the railroad crossing, wherein the one or more auditory cues comprise fading of a train horn sound, an absence of a bell sound associated with an alarm sound-making component associated with the railroad crossing, verbal instructions of a flagman directing traffic at the railroad crossing to cross the railroad.

Clause 40. The non-transitory computer-readable medium of Clause 35, wherein determining that the train has passed the railroad crossing further comprises determining that the sensor data comprises one or more visual cues that indicate the train has passed the railroad crossing, wherein the one or more visual cues comprise an absence of images showing at least a portion of the train.

Clause 41. A system comprising:
a memory configured to store sensor data that provides information about an environment in front of an autonomous vehicle; and
a control device associated with the autonomous vehicle, the control device comprising a processor operably coupled to the memory, and configured to:
receive the sensor data from at least one sensor associated with the autonomous vehicle;
detect that the autonomous vehicle is approaching a railroad crossing based at least in part upon the sensor data;
determine that the railroad crossing is closed from the sensor data, wherein determining that the railroad crossing is closed comprises detecting a closed railroad crossing sign from the sensor data;
determine one or more re-routing options from map data, wherein the map data comprises at least a portion of a virtual map that shows routes that reach a predetermined destination of the autonomous vehicle;
determine whether at least one re-routing option from among the one or more re-routing options reaches the predetermined destination;
in response to determining that the at least one re-routing option from among the one or more re-routing options reaches the predetermined destination:
select a particular re-routing option from among the at least one re-routing option, wherein the particular re-routing option is selected based at least in part upon determining that the autonomous vehicle is able to travel according to the particular re-routing option autonomously; and
instruct the autonomous vehicle to re-route according to the particular re-routing option.

Clause 42. The system of Clause 41, wherein the processor is further configured, in response to determining that none of the one or more re-routing options leads to the predetermined destination, to instruct the autonomous vehicle to perform a minimal risk condition maneuver.

Clause 43. The system of Clause 42, wherein the minimal risk condition maneuver comprises:
pulling the autonomous vehicle over to a side of a road traveled by the autonomous vehicle; or
stopping the autonomous vehicle.

Clause 44. The system of Clause 41, wherein the processor is further configured, in response to determining that none of the one or more re-routing options leads to the predetermined destination, to communicate a first message that indicates the autonomous vehicle is behind the railroad crossing to an oversight server.

Clause 45. The system of Clause 44, wherein the first message comprises a request to dispatch a driver to a location of the autonomous vehicle.

Clause 46. The system of Clause 41, wherein the processor is further configured to communicate a second message that indicates the railroad crossing is closed to an oversight server.

Clause 47. The system of Clause 41, wherein the processor is further configured to communicate one or more third messages that indicate the railroad crossing is closed to one or more following autonomous vehicles within a communication range from the autonomous vehicle.

Clause 48. A method comprising:
receiving sensor data from at least one sensor associated with an autonomous vehicle, wherein the sensor data that provides information about an environment in front of the autonomous vehicle;
detecting that the autonomous vehicle is approaching a railroad crossing based at least in part upon the sensor data;
determining that the railroad crossing is closed from the sensor data, wherein determining that the railroad crossing is closed comprises detecting a closed railroad crossing sign from the sensor data;
determining one or more re-routing options from map data, wherein the map data comprises at least a portion of a virtual map that shows routes that reach a predetermined destination of the autonomous vehicle;
determining whether at least one re-routing option from among the one or more re-routing options reaches the predetermined destination;
in response to determining that the at least one re-routing option from among the one or more re-routing options reaches the predetermined destination:
selecting a particular re-routing option from among the at least one re-routing option, wherein the particular re-routing option is selected based at least in part upon determining that the autonomous vehicle is able to travel according to the particular re-routing option autonomously; and
instructing the autonomous vehicle to re-route according to the particular re-routing option.

Clause 49. The method of Clause 48, further comprising:
updating the map data to include that the railroad crossing is closed; and
communicating the updated map data to an oversight server.

Clause 50. The method of Clause 49, further comprising communicating the updated map data to one or more following autonomous vehicles within a communication range from the autonomous vehicle.

Clause 51. The method of Clause 48, wherein the particular re-routing option is further selected based at least in part upon determining that the particular re-routing option leads to a least traveling distance to reach the predetermined destination compared to the rest of the one or more re-routing options.

Clause 52. The method of Clause 48, wherein the particular re-routing option is further selected based at least in part upon determining that the particular re-routing option leads to increasing a fuel-saving parameter to reach the predetermined destination compared to the rest of the one or more re-routing options.

Clause 53. The method of Clause 48, wherein determining that the railroad crossing is closed from the sensor data further comprises determining that the sensor data does not comprise any indicator that indicates the railroad crossing is operational.

Clause 54. The method of Clause 53, wherein the indicator comprises one or more of an absence of signal lights associated with the railroad crossing, an absence of a train horn, or an absence of a bell sound associated with an alarm sound-making component associated with the railroad.

Clause 55. A non-transitory computer-readable medium storing instructions that when executed by one or more processors causes the one or more processors to:
    receive sensor data from at least one sensor associated with an autonomous vehicle, wherein the sensor data that provides information about an environment in front of the autonomous vehicle;
    detect that the autonomous vehicle is approaching a railroad crossing based at least in part upon the sensor data;
    determine that the railroad crossing is closed from the sensor data, wherein determining that the railroad crossing is closed comprises detecting a closed railroad crossing sign from the sensor data;
    determine one or more re-routing options from map data, wherein the map data comprises at least a portion of a virtual map that shows routes that reach a predetermined destination of the autonomous vehicle;
    determine whether at least one re-routing option from among the one or more re-routing options reaches the predetermined destination;
    in response to determining that the at least one re-routing option from among the one or more re-routing options reaches the predetermined destination:
        select a particular re-routing option from among the at least one re-routing option, wherein the particular re-routing option is selected based at least in part upon determining that the autonomous vehicle is able to travel according to the particular re-routing option autonomously; and
        instruct the autonomous vehicle to re-route according to the particular re-routing option.

Clause 56. The non-transitory computer-readable medium of Clause 55, wherein determining that the railroad crossing is closed from the sensor data further comprises determining indications in the sensor data that indicate vehicles behind the railroad crossing are re-routing.

Clause 57. The non-transitory computer-readable medium of Clause 55, wherein determining that the railroad crossing is closed from the sensor data is in response to:
    waiting for a threshold period before reaching the railroad crossing; and
    determining that no indication that indicates the railroad crossing is operational is detected from the sensor data during the threshold period.

Clause 58. The non-transitory computer-readable medium of Clause 55, wherein detecting that the autonomous vehicle is approaching the railroad crossing comprises determining that the sensor data comprises one or more indications of the railroad.

Clause 59. The non-transitory computer-readable medium of Clause 58, wherein the one or more indications comprise a railroad crossing sign, crossing arms, or a railroad traffic light.

Clause 60. The non-transitory computer-readable medium of Clause 55, wherein detecting that the autonomous vehicle is approaching the railroad crossing comprises:
    accessing map data that comprises location coordinates of objects on a road traveled by the autonomous vehicle; and
    determining that the map data indicates the railroad crossing on the road.

Clause 61. A system comprising:
    a memory configured to store sensor data that provides information about an environment in front of an autonomous vehicle; and
    a control device associated with the autonomous vehicle, the control device comprising a processor operably coupled to the memory, and configured to:
        receive the sensor data from at least one sensor associated with the autonomous vehicle;
        detect that the autonomous vehicle is approaching a railroad crossing based at least in part upon the sensor data;
        determine that no train is approaching the railroad crossing from the sensor data, wherein determining that no train is approaching the railroad crossing comprises determining that crossing arms associated with the railroad are positioned vertically;
        detect, from the sensor data, an indication of a stopped vehicle in front of the autonomous vehicle and behind the railroad crossing;
        determine whether the stopped vehicle is associated with a mandatory stop rule, wherein:
            the mandatory stop rule indicates that vehicles carrying hazardous materials have to stop behind the railroad crossing even when no train is approaching or traveling through the railroad crossing;
            determining whether the stopped vehicle is associated with the mandatory stop rule comprises:
                waiting for a threshold period;
                determining whether the stopped vehicle moves forward by the threshold period;
                in response to determining that the stopped vehicle does not move forward by the threshold period, determining that the stopped vehicle is not associated with the mandatory stop rule;
                in response to determining that the stopped vehicle moves forward by the threshold period, determining that the stopped vehicle is associated with the mandatory stop rule;
        in response to determining that the stopped vehicle is associated with the mandatory stop rule:
            wait behind the stopped vehicle until the stopped vehicle crosses the railroad crossing; and
            instruct the autonomous vehicle to cross the railroad.

Clause 62. The system of Clause 61, wherein the processor is further configured to determine that the stopped vehicle is broken down in response to determining that the stopped vehicle does not move forward by the threshold period.

Clause 63. The system of Clause 61, wherein the processor is further configured to instruct the autonomous vehicle to change to another lane compared to a lane where the stopped vehicle and the autonomous vehicle are located in response to determining that the stopped vehicle is not associated with the mandatory stop rule.

Clause 64. The system of Clause 61, wherein the processor is further configured, before instructing the autonomous vehicle to cross the railroad, to:
  determine a target lane to travel while crossing the railroad, wherein the target lane is a lane that has available space with at least a length of the autonomous vehicle on another side of the railroad as opposed to a side of the railroad where the autonomous vehicle is traveling; and
  instruct the autonomous vehicle to travel on the target lane.

Clause 65. The system of Clause 64, wherein determining the target lane comprises:
  receiving the sensor data that comprises indications of traffic on the other side of the railroad;
  determining, based at least in part upon the traffic on the other side of the railroad, available distance in each lane of a road on the other side of the railroad;
  comparing the determined available distance in each lane of the road on the other side of the railroad with the length of the autonomous vehicle; and
  determining that the target lane provides the available space with at least the length of the autonomous vehicle on the other side of the railroad.

Clause 66. The system of Clause 64, wherein determining the target lane comprises:
  accessing map data that comprises a particular route reaching a predetermined destination of the autonomous vehicle;
  comparing each route associated with each lane of a road on the other side of the railroad with the particular route; and
  selecting, based at least in part upon the comparison, the target lane that leads to the particular route toward the predetermined destination.

Clause 67. The system of Clause 64, wherein the processor is further configured, before instructing the autonomous vehicle to cross the railroad, to:
  determine that the target lane no longer provides available space with at least the length of the autonomous vehicle on the other side of the railroad;
  in response to determining the target lane no longer provides available space with at least the length of the autonomous vehicle on the other side of the railroad:
    instruct the autonomous vehicle to stop before entering the railroad crossing;
    wait until the target lane provides available space with at least the length of the autonomous vehicle on the other side of the railroad; and
    instruct the autonomous vehicle to cross the railroad.

Clause 68. A method comprising:
  receiving sensor data from at least one sensor associated with an autonomous vehicle, wherein the sensor data that provides information about an environment in front of the autonomous vehicle;
  detecting that the autonomous vehicle is approaching a railroad crossing based at least in part upon the sensor data;
  determining that no train is approaching the railroad crossing from the sensor data, wherein determining that no train is approaching the railroad crossing comprises determining that crossing arms associated with the railroad are positioned vertically;
  detecting, from the sensor data, an indication of a stopped vehicle in front of the autonomous vehicle and behind the railroad crossing;
  determining whether the stopped vehicle is associated with a mandatory stop rule, wherein:
    the mandatory stop rule indicates that vehicles carrying hazardous materials have to stop behind the railroad crossing even when no train is approaching or traveling through the railroad crossing;
    determining whether the stopped vehicle is associated with the mandatory stop rule comprises:
    waiting for a threshold period;
    determining whether the stopped vehicle moves forward by the threshold period;
    in response to determining that the stopped vehicle does not move forward by the threshold period, determining that the stopped vehicle is not associated with the mandatory stop rule;
    in response to determining that the stopped vehicle moves forward by the threshold period, determining that the stopped vehicle is associated with the mandatory stop rule;
  in response to determining that the stopped vehicle is associated with the mandatory stop rule:
    waiting behind the stopped vehicle until the stopped vehicle crosses the railroad crossing; and
    instructing the autonomous vehicle to cross the railroad.

Clause 69. The method of Clause 68, wherein detecting that the autonomous vehicle is approaching the railroad crossing comprises:
  accessing map data that comprises location coordinates of objects on a road traveled by the autonomous vehicle; and
  determining that the map data indicates the railroad crossing on the road.

Clause 70. The method of Clause 68, wherein detecting that the autonomous vehicle is approaching the railroad crossing comprises determining that the sensor data comprises one or more indications of the railroad.

Clause 71. The method of Clause 70, wherein the one or more indications comprise a railroad crossing sign, the crossing arms, or a railroad traffic light.

Clause 72. The method of Clause 68, wherein determining that no train is approaching the railroad crossing from the sensor data further comprises determining that signal lights associated with the railroad are indicating that no train is approaching the railroad crossing.

Clause 73. The method of Clause 68, wherein determining that no train is approaching the railroad crossing from the sensor data further comprises determining one or more auditory cues that indicate no train is approaching the railroad crossing.

Clause 74. The method of Clause 73, wherein the one or more auditory cues comprise an absence of a train horn or an absence of a bell sound associated with an alarm sound-making component associated with the railroad.

Clause 75. A non-transitory computer-readable medium storing instructions that when executed by one or more processors causes the one or more processors to:
  receive sensor data from at least one sensor associated with an autonomous vehicle, wherein the sensor data that provides information about an environment in front of the autonomous vehicle;
  detect that the autonomous vehicle is approaching a railroad crossing based at least in part upon the sensor data;
  determine that no train is approaching the railroad crossing from the sensor data, wherein determining that no train is approaching the railroad crossing comprises determining that crossing arms associated with the railroad are positioned vertically;
detect, from the sensor data, an indication of a stopped vehicle in front of the autonomous vehicle and behind the railroad crossing;
determine whether the stopped vehicle is associated with a mandatory stop rule, wherein:
the mandatory stop rule indicates that vehicles carrying hazardous materials have to stop behind the railroad crossing even when no train is approaching or traveling through the railroad crossing;
determining whether the stopped vehicle is associated with the mandatory stop rule comprises:
waiting for a threshold period;
determining whether the stopped vehicle moves forward by the threshold period;
in response to determining that the stopped vehicle does not move forward by the threshold period, determining that the stopped vehicle is not associated with the mandatory stop rule;
in response to determining that the stopped vehicle moves forward by the threshold period, determining that the stopped vehicle is associated with the mandatory stop rule;
in response to determining that the stopped vehicle is associated with the mandatory stop rule:
wait behind the stopped vehicle until the stopped vehicle crosses the railroad crossing; and
instruct the autonomous vehicle to cross the railroad.

Clause 76. The non-transitory computer-readable medium of Clause 75, wherein determining that no train is approaching the railroad crossing from the sensor data further comprises determining that the sensor data does not comprise even one image showing at least a portion of a train.

Clause 77. The non-transitory computer-readable medium of Clause 75, wherein determining that no train is approaching the railroad crossing from the sensor data further comprises determining that the sensor data does not comprise even one image showing a person directing traffic at the railroad crossing to cross the railroad.

Clause 78. The non-transitory computer-readable medium of Clause 75, wherein the at least one sensor comprises at least one of a camera, a microphone, a light detection and ranging sensor, an infrared sensor, or a radar.

Clause 79. The non-transitory computer-readable medium of Clause 75, wherein the sensor data comprises at least one of an image feed, a video feed, an audio feed, a light detection and ranging data feed, an infrared image feed, or a radar data feed.

Clause 80. The non-transitory computer-readable medium of Clause 75, wherein the autonomous vehicle is a semi-truck tractor unit attached to a trailer.

Clause 81. The system of any of Clauses 1-7, 21-27, 41-47, and/or 61-67, wherein the processor is further configured to perform one or more operations of any method according to any of Clauses 8-14, 28-34, 48-54, and/or 68-74.

Clause 82. The system of any of Clauses 1-7, 21-27, 41-47, and/or 61-67, wherein the processor is further configured to perform one or more operations according to any of Clauses 15-20, 35-40, 55-60, and/or 75-80.

Clause 83. An apparatus comprising means for performing a method according to any of Clauses 8-14, 28-34, 48-54, and/or 68-74.

Clause 84. An apparatus comprising means for performing one or more instructions according to any of Clauses 15-20, 35-40, 55-60, and/or 75-80.

Clause 85. The non-transitory computer-readable medium of any of Clauses 15-20, 35-40, 55-60, and/or 75-80 storing instructions that when executed by the one or more processors further cause the one or more processors to perform one or more operations of a method according to any of Clauses 8-14, 28-34, 48-54, and/or 68-74 when run on a system.

Clause 86. The system of any of Clauses 1-7, wherein the processor is further configured to perform one or more operations of any of method according to any of Clauses 8-14.

Clause 87. The system of any of Clauses 1-7, wherein the processor is further configured to perform one or more operations according to any of Clauses 15-20.

Clause 88. An apparatus comprising means for performing a method according to any of Clauses 8-14.

Clause 89. An apparatus comprising means for performing one or more instructions according to any of Clauses 15-20.

Clause 90. The non-transitory computer-readable medium of any of Clauses 15-20 storing instructions that when executed by the one or more processors further cause the one or more processors to perform one or more operations of a method according to any of Clauses 8-14, when run on a system.

Clause 91. The system of any of Clauses 21-27, wherein the processor is further configured to perform one or more operations of any of method according to any of Clauses 28-34.

Clause 92. The system of any of Clauses 21-27, wherein the processor is further configured to perform one or more operations according to any of Clauses 35-40.

Clause 93. An apparatus comprising means for performing a method according to any of Clauses 28-34.

Clause 94. An apparatus comprising means for performing one or more instructions according to any of Clauses 35-40.

Clause 95. The non-transitory computer-readable medium of any of Clauses 35-40 storing instructions that when executed by the one or more processors further cause the one or more processors to perform one or more operations of a method according to any of Clauses 28-34, when run on a system.

Clause 96. The system of any of Clauses 41-47, wherein the processor is further configured to perform one or more operations of any of method according to any of Clauses 48-54.

Clause 97. The system of any of Clauses 41-47, wherein the processor is further configured to perform one or more operations according to any of Clauses 55-60.

Clause 98. An apparatus comprising means for performing a method according to any of Clauses 48-54.

Clause 99. An apparatus comprising means for performing one or more instructions (128, 1080) according to any of Clauses 55-60.

Clause 100. The non-transitory computer-readable medium of any of Clauses 55-60 storing instructions that when executed by the one or more processors further cause the one or more processors to perform one or more operations of a method according to any of Clauses 48-54, when run on a system.

Clause 101. The system of any of Clauses 61-67, wherein the processor is further configured to perform one or more operations of any of method according to any of Clauses 68-74.

Clause 102. The system of any of Clauses 61-67, wherein the processor is further configured to perform one or more operations according to any of Clauses 75-80.

Clause 103. An apparatus comprising means for performing a method according to any of Clauses 68-74.

Clause 104. An apparatus comprising means for performing one or more instructions according to any of Clauses 75-80.

Clause 105. The non-transitory computer-readable medium of any of Clauses 75-80 storing instructions that when executed by the one or more processors further cause the one or more processors to perform one or more operations of a method according to any of Clauses 68-74, when run on a system.

The invention claimed is:

1. A system comprising:
   a memory configured to store sensor data that provides information about an environment in front of an autonomous vehicle; and
   a control device associated with the autonomous vehicle, the control device comprising a processor operably coupled to the memory, and configured to:
      receive the sensor data from at least one sensor associated with the autonomous vehicle;
      detect that the autonomous vehicle is approaching a railroad crossing based at least in part upon the sensor data;
      determine a target lane to travel while crossing the railroad, wherein the target lane is a lane that has available space with at least a length of the autonomous vehicle on another side of the railroad as opposed to a side of the railroad where the autonomous vehicle is currently traveling;
      in response to the autonomous vehicle being on a lane different from the target lane, instruct the autonomous vehicle to change to the target lane before entering the railroad crossing;
      determine that a train is approaching the railroad crossing from the sensor data, wherein determining that the train is approaching the railroad crossing comprises determining that crossing arms associated with the railroad are coming down or already at horizontal position;
      instruct the autonomous vehicle to travel toward the railroad and stop within a threshold distance window from the railroad;
      wait for the train to pass the railroad crossing;
      determine that the train has passed the railroad crossing, wherein determining that the train has passed the railroad crossing comprises detecting that the sensor data comprises indicators indicating that the crossing arms have moved up to vertical position;
      determine whether the target lane still provides available space with at least the length of the autonomous vehicle on the other side of the railroad; and
      in response to determining that the target lane still provides available space with at least the length of the autonomous vehicle on the other side of the railroad, instruct the autonomous vehicle to cross the railroad.

2. The system of claim 1, wherein the processor is further configured to:
   in response to determining that the target lane no longer provides available space with at least the length of the autonomous vehicle on the other side of the railroad:
      instruct the autonomous vehicle to stop before entering the railroad crossing;
      after waiting until the target lane provides available space with at least the length of the autonomous vehicle on the other side of the railroad, wait until the target lane provides available space with at least the length of the autonomous vehicle on the other side of the railroad; and
      instruct the autonomous vehicle to cross the railroad.

3. The system of claim 1, wherein detecting that the autonomous vehicle is approaching the railroad crossing comprises determining that the sensor data comprises one or more indications of the railroad.

4. The system of claim 3, wherein the one or more indications comprise a railroad crossing sign, the crossing arms, or a railroad traffic light.

5. The system of claim 1, wherein detecting that the autonomous vehicle is approaching the railroad crossing comprises:
   accessing map data that comprises location coordinates of objects on a road traveled by the autonomous vehicle; and
   determining that the map data indicates the railroad crossing on the road.

6. The system of claim 1, wherein determining the target lane comprises:
   receiving the sensor data that comprises indications of traffic on the other side of the railroad;
   determining, based at least in part upon the traffic on the other side of the railroad, available distance in each lane of a road on the other side of the railroad;
   comparing the determined available distance in each lane of the road on the other side of the railroad with the length of the autonomous vehicle; and
   determining that the target lane provides the available space with at least the length of the autonomous vehicle on the other side of the railroad.

7. The system of claim 1, wherein determining the target lane comprises:
   accessing map data that comprises a particular route reaching a predetermined destination of the autonomous vehicle;
   comparing each route associated with each lane of a road on the other side of the railroad with the particular route; and
   selecting, based at least in part upon the comparison, the target lane that leads to the particular route toward the predetermined destination.

8. A method comprising:
   receiving sensor data from at least one sensor associated with an autonomous vehicle, wherein the sensor data that provides information about an environment in front of the autonomous vehicle;
   detecting that the autonomous vehicle is approaching a railroad crossing based at least in part upon the sensor data;
   determining a target lane to travel while crossing the railroad, wherein the target lane is a lane that has available space with at least a length of the autonomous vehicle on another side of the railroad as opposed to a side of the railroad where the autonomous vehicle is currently traveling;
   in response to the autonomous vehicle being on a lane different from the target lane, instructing the autonomous vehicle to change to the target lane before entering the railroad crossing;
   determining that a train is approaching the railroad crossing from the sensor data, wherein determining that the train is approaching the railroad crossing comprises determining that crossing arms associated with the railroad are coming down or already at horizontal position;

instructing the autonomous vehicle to travel toward the railroad and stop within a threshold distance window from the railroad;

waiting for the train to pass the railroad crossing;

determining that the train has passed the railroad crossing, wherein determining that the train has passed the railroad crossing comprises detecting that the sensor data comprises indicators indicating that the crossing arms have moved up to vertical position;

determining whether the target lane still provides available space with at least the length of the autonomous vehicle on the other side of the railroad; and in response to determining that the target lane still provides available space with at least the length of the autonomous vehicle on the other side of the railroad, instructing the autonomous vehicle to cross the railroad.

9. The method of claim 8, wherein determining that the train is approaching the railroad crossing from the sensor data further comprises determining that signal lights associated with the railroad are indicating that the train is approaching the railroad crossing.

10. The method of claim 8, wherein determining that the train is approaching the railroad crossing from the sensor data further comprises determining one or more auditory cues that indicate the train is approaching the railroad crossing.

11. The method of claim 10, wherein the one or more auditory cues comprise a train horn sound or a bell sound associated with an alarm sound-making component associated with the railroad.

12. The method of claim 8, wherein determining that the train is approaching the railroad crossing from the sensor data further comprises determining that the sensor data comprises at least one image showing at least a portion of a train.

13. The method of claim 8, wherein determining that the train is approaching the railroad crossing from the sensor data further comprises determining that the sensor data comprises at least one image showing a person directing traffic at the railroad crossing to stop behind the railroad.

14. The method of claim 8, wherein the autonomous vehicle is a semi-truck tractor unit attached to a trailer.

15. A non-transitory computer-readable medium storing instructions that when executed by one or more processors causes the one or more processors to:

receive sensor data from at least one sensor associated with an autonomous vehicle, wherein the sensor data that provides information about an environment in front of the autonomous vehicle;

detect that the autonomous vehicle is approaching a railroad crossing based at least in part upon the sensor data;

determine a target lane to travel while crossing the railroad, wherein the target lane is a lane that has available space with at least a length of the autonomous vehicle on another side of the railroad as opposed to a side of the railroad where the autonomous vehicle is currently traveling;

in response to the autonomous vehicle being on a lane different from the target lane, instruct the autonomous vehicle to change to the target lane before entering the railroad crossing;

determine that a train is approaching the railroad crossing from the sensor data, wherein determining that the train is approaching the railroad crossing comprises determining that crossing arms associated with the railroad are coming down or already at horizontal position;

instruct the autonomous vehicle to travel toward the railroad and stop within a threshold distance window from the railroad;

wait for the train to pass the railroad crossing;

determine that the train has passed the railroad crossing, wherein determining that the train has passed the railroad crossing comprises detecting that the sensor data comprises indicators indicating that the crossing arms have moved up to vertical position;

determine whether the target lane still provides available space with at least the length of the autonomous vehicle on the other side of the railroad; and in response to determining that the target lane still provides available space with at least the length of the autonomous vehicle on the other side of the railroad, instruct the autonomous vehicle to cross the railroad.

16. The non-transitory computer-readable medium of claim 15, wherein the instructions when executed by the one or more processors, further cause the one or more processors to before instructing the autonomous vehicle to cross the railroad:
instructing the autonomous vehicle to slow down to a particular speed; and
instructing the autonomous vehicle to change a gear of the autonomous vehicle to a desired gear such that the one or more processors do not have to change from the desired gear to another gear while crossing the railroad.

17. The non-transitory computer-readable medium of claim 16, wherein the desired gear is determined based at least in part upon one or more of:
terrain around the railroad crossing;
weather conditions in an area surrounding the railroad crossing;
road conditions on a traveling path of the autonomous vehicle toward the railroad crossing;
the particular speed; or
traffic at the railroad crossing.

18. The non-transitory computer-readable medium of claim 16, wherein the particular speed is determined based at least in part upon one or more of:
terrain around the railroad crossing;
weather conditions in an area surrounding the railroad crossing;
road conditions on a traveling path of the autonomous vehicle toward the railroad crossing; or
traffic at the railroad crossing.

19. The non-transitory computer-readable medium of claim 15, wherein determining that the train has passed the railroad crossing further comprises determining that the sensor data comprises one or more auditory cues that indicate the train has passed the railroad crossing, wherein the one or more auditory cues comprise fading of a train horn sound, an absence of a bell sound associated with an alarm sound-making component associated with the railroad crossing, verbal instructions of a flagman directing traffic at the railroad crossing to cross the railroad.

20. The non-transitory computer-readable medium of claim 15, wherein determining that the train has passed the railroad crossing further comprises determining that the sensor data comprises one or more visual cues that indicate the train has passed the railroad crossing, wherein the one or more visual cues comprise an absence of images showing at least a portion of the train.

\* \* \* \* \*